(12) United States Patent
Kumar

(10) Patent No.: US 6,692,660 B2
(45) Date of Patent: Feb. 17, 2004

(54) HIGH LUMINESCENCE PHOSPHOR PARTICLES AND RELATED PARTICLE COMPOSITIONS

(75) Inventor: Sujeet Kumar, Newark, CA (US)

(73) Assignee: NanoGram Corporation, Fremont, CA (US)

( * ) Notice: Subject to any disclaimer, the term of this patent is extended or adjusted under 35 U.S.C. 154(b) by 62 days.

(21) Appl. No.: 09/843,195

(22) Filed: Apr. 26, 2001

(65) Prior Publication Data

US 2002/0179886 A1 Dec. 5, 2002

(51) Int. Cl.[7] .............................................. C09K 11/08

(52) U.S. Cl. .................... 252/301.4 R; 252/301.4 P; 252/301.5; 252/301.6 R; 252/301.6 P; 501/152

(58) Field of Search .................... 423/600; 252/301.4 R, 252/301.4 P, 301.4 F, 301.5, 301.6 R, 301.6 P; 501/152

(56) References Cited

U.S. PATENT DOCUMENTS

| | | |
|---|---|---|
| 2,603,554 A | 7/1952 | Calbeck |
| 2,610,154 A | 9/1952 | Brown, Jr. |
| 2,854,413 A | 9/1958 | Geary |

(List continued on next page.)

FOREIGN PATENT DOCUMENTS

| | | |
|---|---|---|
| WO | WO 98/37165 | 8/1998 |
| WO | WO 99/23191 | 5/1999 |
| WO | WO 99/46204 | 9/1999 |
| WO | WO 99/50880 | 10/1999 |
| WO | WO 00/46867 | 8/2000 |
| WO | WO 00/54291 | 9/2000 |

OTHER PUBLICATIONS

Chemical Abstract citation 135:144231: Mechanism of thermal degradation of blue BaMgAl10O17:Eu (BAM) phosphor, Zhou e al, Faguang Xuebao (2000), 21, (4), 345–48.*
Jean et al, "Spherical BaMgAl10O17:Eu2+ Phosphor Prepared by Aerosol Pyrolysis Technique for PDP Application", Jour. Electrochem. Soc., 149 (9), 2001, pp. H128–H131.*
Chemical Abstract cititation 132:327319: Blue emitting CaAl2O4:eu2+ phohors for PDP application, Tanaka et al, Journ. Lumines., (2000) 87–89, 1250–1253.*
Chemical Abstract citation" Photoluminescence imaging of phosphor particles using near–field optical microscope with UV light excitation", Nishikawa et al, Jour. Microscopy, (1999), 194 (2/3), 415–420.*
Chemical Abstract citation: 127:196928: "Photocalorimetric measurement of the quantum efficiencies of phosphors", Zachau, Journ. Luminesc. (1997), 72–74, 792–793.*
Chemical Abstract citation 111:143246: "Europium–doped strontium aluminum oxide (2SrO 3Al2O3) and barium calcium aluminum oxide (1.29(Ba,Ca)O,6Al2O3). Two new blue emitting phosphors", Smets et al, Journ. Eelectrochem. Soc., (1989), 136(7), 2119–23.*
Ramponi et al., "New Er–doped phosphate glass for ion–exchange active waveguides: accurate determination of the refraction index," Optical Materials, 14, pp. 292–296, 2000.

(List continued on next page.)

Primary Examiner—C. Melissa Koslow
(74) Attorney, Agent, or Firm—Patterson, Thuente, Skaar & Christensen, P.A.; Peter S. Dardi

(57) ABSTRACT

Methods for producing metal/metalloid oxide particles comprise rare earth metals herein include reacting a reactant stream in a gas flow. The reactant stream includes a rare earth metal precursor and an oxygen source. A collection of particles comprising metal/metalloid oxide have an average particle size from about 15 nm to about 1 micron. The metal/metalloid oxide comprises a non-rare earth metal oxide wherein less than about 25 percent of a non-rare earth metal is substituted with a rare earth metal. The particles are useful as phosphors, for example for use in displays.

22 Claims, 14 Drawing Sheets

U.S. PATENT DOCUMENTS

| | | | |
|---|---|---|---|
| 2,863,084 | A | 12/1958 | Arnott et al. |
| 2,898,191 | A | 8/1959 | Conn et al. |
| 2,968,627 | A | 1/1961 | Wachtel |
| 3,040,202 | A | 6/1962 | Lehmann |
| 3,131,025 | A | 4/1964 | Carnall, Jr. et al. |
| 3,260,879 | A | 7/1966 | Feuer |
| 3,406,228 | A | 10/1968 | Hardy et al. |
| 3,691,088 | A | 9/1972 | Pelton |
| 3,776,754 | A | 12/1973 | Levinos |
| 3,984,586 | A | 10/1976 | Kawarada et al. |
| 4,116,864 | A | 9/1978 | Kagami et al. |
| 4,172,920 | A | 10/1979 | Kanda et al. |
| 4,272,397 | A | 6/1981 | Fukuda et al. |
| 4,275,333 | A | 6/1981 | Kagami et al. |
| 4,340,839 | A | 7/1982 | Fujita et al. |
| 4,680,231 | A | 7/1987 | Yamuaura et al. |
| H429 | H | 2/1988 | Harris et al. |
| 4,738,798 | A | 4/1988 | Mahler |
| 4,808,398 | A | 2/1989 | Heistand, II |
| 4,842,832 | A | 6/1989 | Inoue et al. |
| 4,921,767 | A | 5/1990 | Datta et al. |
| 4,960,654 | A | 10/1990 | Yoshinaka et al. |
| 5,106,828 | A | 4/1992 | Bhargava et al. |
| 5,128,063 | A | 7/1992 | Kamikubo |
| 5,152,973 | A | 10/1992 | Spencer |
| 5,167,990 | A | 12/1992 | Tono et al. |
| 5,225,820 | A | 7/1993 | Clerc |
| 5,250,281 | A | 10/1993 | Imai et al. |
| 5,264,031 | A | 11/1993 | Palmer et al. |
| 5,390,276 | A | 2/1995 | Tai et al. |
| 5,418,062 | A | 5/1995 | Budd |
| 5,442,254 | A | 8/1995 | Jaskie |
| 5,447,708 | A | 9/1995 | Helble et al. |
| 5,455,489 | A | 10/1995 | Bhargava |
| 5,460,701 | A | 10/1995 | Parker et al. |
| 5,498,369 | A | 3/1996 | Bredol et al. |
| 5,504,599 | A | 4/1996 | Okibayashi et al. |
| 5,527,519 | A | 6/1996 | Miksits et al. |
| 5,578,899 | A | 11/1996 | Haven et al. |
| 5,635,154 | A | 6/1997 | Arai et al. |
| 5,637,258 | A | 6/1997 | Goldburt et al. |
| 5,643,496 | A | 7/1997 | Brese et al. |
| 5,644,193 | A | 7/1997 | Matsuda et al. |
| 5,651,712 | A | 7/1997 | Potter |
| 5,699,035 | A | 12/1997 | Ito et al. |
| 5,770,113 | A | 6/1998 | Iga et al. |
| 5,893,999 | A * | 4/1999 | Tamatani et al. ..... 252/301.4 R |
| 5,952,125 | A | 9/1999 | Bi et al. |
| 5,952,665 | A | 9/1999 | Bhargava |
| 5,958,348 | A | 9/1999 | Bi et al. |
| 5,989,514 | A | 11/1999 | Bi et al. |
| 6,036,886 | A | 3/2000 | Chhabra et al. |
| 6,039,894 | A * | 3/2000 | Sanjurjo et al. ...... 252/301.4 R |
| 6,048,616 | A | 4/2000 | Gallagher et al. |
| 6,099,798 | A | 8/2000 | Kambe et al. |
| 6,180,029 | B1 | 1/2001 | Hampden-Smith et al. |
| 6,187,225 | B1 * | 2/2001 | Rao ..................... 252/301.4 R |
| 6,193,908 | B1 | 2/2001 | Hampden-Smith et al. |
| 6,193,936 | B1 | 2/2001 | Gardner et al. |
| 6,210,604 | B1 | 4/2001 | Hampden-Smith et al. |
| 6,225,007 | B1 | 5/2001 | Horne et al. |
| 6,391,273 | B1 * | 5/2002 | Konrad et al. .............. 423/263 |
| 6,391,494 | B2 | 5/2002 | Reitz et al. |
| 6,413,489 | B1 * | 7/2002 | Ying et al. .................. 423/600 |

OTHER PUBLICATIONS

Bender et al., "Synthesis and Fluorescence of Neodymium–Doped Barium Fluoride Nanoparticles," Chem. Mater., vol. 12, No. 7, pp. 1969–1976, 2000.

Lee et al., "Controlled formation of nanoparticles utilizing laser irradiation in a flame and their characteristics," Applied Physics Letters, vol. 79, No. 15, pp. 2459–2461, Oct. 8, 2001.

Vermelho et al., "The influence of sodium ions on rare–earth solubility in silica–on–silicon $SiO_2$–$P_2O_5$ glass hosts fabricated by flame hydrolysis deposition," Proceedings of SPIE, vol. 4277, pp. 381–387, 2001.

Ballato et al., "Fabrication of fibers with high rare–earth concentrations for Faraday isolator applications," Applied Optics, vol. 34, No. 30, pp. 6848–6854, Oct. 20, 1995.

International Search Report (PCT/US02/12146) dated Aug. 6, 2002.

Goldstein et al., Observation of Melting in 30A Diameter CdS NanoCrystals, Met. Res. Soc. Symp. Proc. vol. 206, pp. 271–274, 1991.

Curtin, The Field Emission Display: A New Flat Pane Technology, Conf. Rec. of the 1991 Int'l Display Res. Conf., pp. 12–15, Oct. 1991.

Tissue et al., Synthesis and Characterization of Metal–Oxide Nanocrystals Prepared by $CO_2$—Laser–Heated Vaporization/Condensation, Journal of the SID, vol. 4(3), pp. 213–217, Oct. 1996.

Siegel, Creating Nanophase Materials, Scientific American; 2 pages, Dec. 1996.

J.S. Yoo et al., The Effects of Particle Size and Surface Recombination Rate on the Brightness of Low–Voltage Phosphor, J. App. Phys. 81(6), 2810–2813, Mar. 15, 1997.

El–Shall et al., Synthesis of Nanoparticles by a Laser Vaporization–Controlled Condensation Technique, SPIE, vol. 3123, pp. 98–108, Jul. 1997.

Oshio et al., Firing Technique for Preparing a $BaMgAl_{10}O_{17}$: $Eu^{2+}$ Phosphor with Controlled Particle Shape and Size, Journal of the Electrochemical Society, 146(1), pp. 392–399, 1999.

Konrad et al., Chemical Vapor Synthesis and Luminescence Properties of Nanocrystalline Cubic $Y_2O_3$:Eu, J. Appl. Phys., vol. 86, No. 6, pp. 3129–3133, Sep. 15, 1999.

J.S. Yoo et al., Spherical $BaMgAl_{10}O_{17}$:$Eu^{2+}$ Phosphor Prepared by Aerosol Pyrolysis Technique for PDP Applications, Journal of the Electrochemical Society, 148(9) H128–H131, 2001.

* cited by examiner

HIGH LUMINESCENCE PHOSPHOR PARTICLES AND RELATED PARTICLE COMPOSITIONS

BACKGROUND OF THE INVENTION

The invention relates to method for synthesizing metal/metalloid oxide particles with rare earth metals, especially metal/metalloid oxides with fluorescent properties. In addition, the invention relates to submicron metal/metalloid oxide particles with rare earth metals and displays produced from these particles.

Electronic displays often use phosphor materials, which emit visible light in response to interaction with electrons. Phosphor materials can be applied to substrates to produce cathode ray tubes, flat panel displays and the like. Improvements in display devices place stringent demands on the phosphor materials, for example, due to decreases in electron velocity and increases in display resolution. Electron velocity is reduced in order to reduce power demands. In particular, flat panel displays generally require phosphors that are responsive to low velocity electrons or low voltages.

In addition, a desire for color display requires the use of materials or combinations of materials that emit light at different wavelengths at positions in the display that can be selectively excited. A variety of materials have been used as phosphors. In order to obtain materials that emit at desired wavelengths of light, activators have been doped into phosphor material. Alternatively, multiple phosphors can be mixed to obtain the desired emission. Furthermore, the phosphor materials must show sufficient luminescence.

In addition, technological advances have increased the demand for improved material processing with strict tolerances on processing parameters. As miniaturization continues even further, material parameters will need to fall within stricter tolerances. Current integrated circuit technology already requires tolerances on processing dimensions on a submicron scale.

Various metal compositions exhibit desired phosphorescent properties upon excitation. Specifically, various metal oxides, including rare earth metal oxides exhibit fluorescence. In addition, doping of rare earth metals into non-rare earth metal oxides can be used to adjust the wavelength and luminosity of the phosphor particles.

SUMMARY OF THE INVENTION

In a first aspect, the invention pertains to a method for producing metal/metalloid oxide particles comprising rare earth metals. The method includes reacting a reactant stream in a gas flow wherein the reaction is driven by energy from a light beam. The reactant stream comprises a rare earth metal precursor and an oxygen source. The metal oxides can also include a non-rare earth metal/metalloid by introducing a non-rare earth metal/metalloid precursor into the flow.

In a further aspect, the invention pertains to a collection of particles comprising a metal/metalloid oxide having an average particle size from about 15 nm to about 1 micron. The metal/metalloid oxide comprises a non-rare earth metal oxide wherein less than about 10 mole percent of a stoichiometric amount of a non-rare earth metal/metalloid is substituted with rare earth metal. The metal/metalloid oxide particles can be used in a display device.

In another aspect the invention pertains to a collection of particles comprising barium magnesium aluminum oxide having an average particle size of less than 500 nm.

Furthermore, the invention pertains to a method of making a collection of metal/metalloid sulfides particles with an average particle size of less than about 500 nm. The method comprises contacting metal/metalloid oxide particles with $H_2S$ at a temperature below the melting temperature of the metal/metalloid oxide particles and the metal/metalloid sulfide particles. The metal/metalloid oxide particle have an average particle size under 500 nm.

In addition, the invention pertains to a collection of rare earth doped metal/metalloid sulfide particles having an average particle size from about 15 nm to about 500 nm.

DETAILED DESCRIPTION OF THE ILLUSTRATIVE EMBODIMENTS

Figure 1:
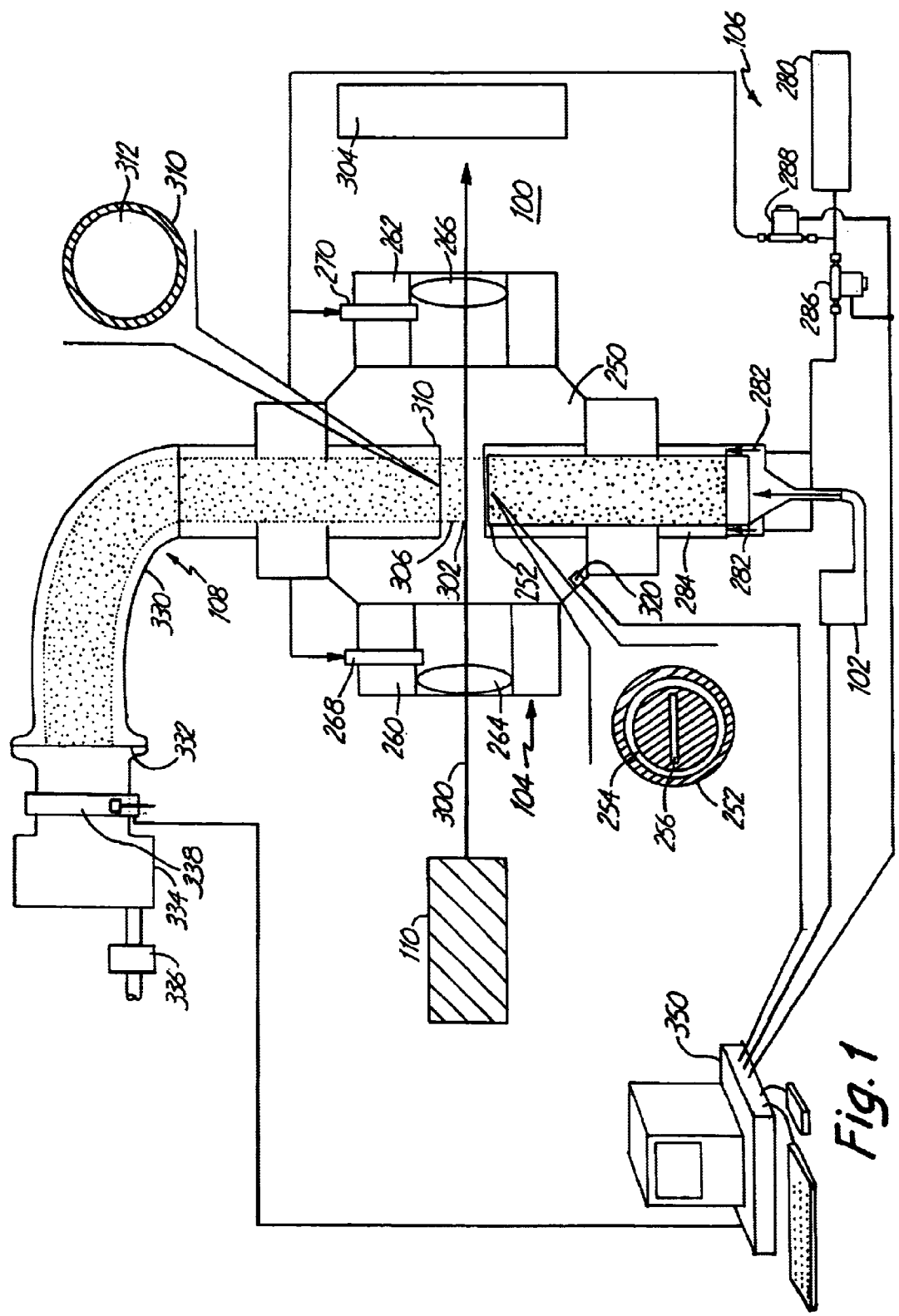
FIG. 1 is a schematic, sectional view of an embodiment of a laser pyrolysis apparatus, where the cross section is taken through the middle of the laser radiation path. The upper insert is a bottom view of the collection nozzle, and the lower insert is a top view of the injection nozzle.

Pyrolysis, especially light drive pyrolysis, has been demonstrated to be an excellent approach for the production of rare earth metal oxide particles and rare earth doped metal/metalloid oxide particles. Rare earth metal/metalloid sulfides and rare earth doped metal/metalloid sulfides can be formed from, respectively, the rare earth metal oxides or the rare earth doped metal/metalloid oxides. The resulting particles are suitable for use as phosphors, which can be used for the production of displays. In particular, the particles have submicron average particles sizes and high luminoscities. In some embodiments, the rare earth metals are dopants that displace corresponding non-rare earth metals/metalloids from the metal/metalloid oxide or metal/metalloid sulfide lattice. Alternatively, the particles can include stoichiometric amounts of rare earth metal, alone or in combination with other metals/metalloids.

Submicron metal oxide particles with various stoichiometries and crystal structures can be produced by pyrolysis, especially laser pyrolysis, alone or with additional processing. In particular, approaches have been developed for the synthesis of multiple metal oxide composite particles. The plurality of metals are introduced into the reactant stream. It has been discovered that these approaches can be generalized for the production of rare earth metal oxides, mixed metal/metalloid rare earth oxides and rare earth doped metal/metalloid oxides. By appropriately selecting the composition in the reactant stream and the processing conditions, submicron particles incorporating the desired metal/metalloid oxide stoichiometry can be formed.

Preferred collections of metal/metalloid oxide particles have an average diameter less than a micron and high uniformity with a narrow distribution of particle diameters. To generate desired submicron metal/metalloid oxide particles, laser pyrolysis can be used either alone or in combination with additional processing, such as heat processing. Specifically, laser pyrolysis has been found to be an excellent process for efficiently producing submicron (less than about 1 micron average diameter) and nanoscale (less than about 100 nm average diameter) metal/metalloid oxide particles with a narrow distribution of average particle diameters. In addition, submicron metal/metalloid oxide particles produced by laser pyrolysis can be subjected to heating under mild conditions in an oxygen environment or an inert environment to alter the crystal properties and/or the stoichiometry of the particles. Thus, a large variety of different types of metal/metalloid oxide particles can be produced using these approaches.

A basic feature of successful application of laser pyrolysis for the production of metal/metalloid oxide particles is production of a reactant stream containing one or more appropriate metal/metalloid precursors. A source of atomic oxygen is required. The atomic oxygen can be bonded within the metal/metalloid precursors and/or can be supplied by a separate oxygen source, such as molecular oxygen. Similarly, unless the metal precursors and/or the oxygen source are an appropriate radiation absorber, an additional radiation absorber is added to the reactant stream.

In laser pyrolysis, the reactant stream is pyrolyzed by an intense light beam, such as a laser beam. While a laser beam is a convenient energy source, other intense light sources can be used in laser pyrolysis. Laser pyrolysis provides for formation of phases of materials that are difficult to form under thermodynamic equilibrium conditions. As the reactant stream leaves the light beam, the metal/metalloid oxide particles are rapidly quenched.

Because of the resulting high uniformity and narrow particle size distribution, laser pyrolysis is a preferred approach for producing submicron metal/metalloid oxide particles. However, other approaches involving flowing reactant streams can be used to synthesize submicron metal/metalloid oxide particles for the improved production approaches for producing metal/metalloid oxides with rare earth metals. Suitable alternative approaches include, for example, flame pyrolysis and thermal pyrolysis. Flame pyrolysis can be performed with a hydrogen-oxygen flame, wherein the flame supplies the energy to drive the pyrolysis. Such a flame pyrolysis approach should produce similar materials as the laser pyrolysis techniques herein, except that flame pyrolysis approaches generally do not produce comparable high uniformity and a narrow particle size distribution that can be obtained by laser pyrolysis. A suitable flame production apparatus is described in U.S. Pat. No. 5,447,708 to Helble et al., entitled "Apparatus for Producing Nanoscale Ceramic Particles," incorporated herein by reference. Furthermore, submicron particles can be produced by adapting the laser pyrolysis methods with a thermal reaction chamber such as the apparatus described in U.S. Pat. No. 4,842,832 to Inoue et al., "Ultrafine Spherical Particles of Metal Oxide and a Method for the Production Thereof," incorporated herein by reference.

Traditionally, phosphors are synthesized by solid state reactions between raw materials at high temperatures. In general, phosphors involve a host crystal with an activator. The activator is used to increase luminosity and alter the luminescent color of the phosphors. The activators generally take the form of a dopant that is introduced into the host crystal at low mole fractions. Other materials, called flux, can be added to facilitate the solid state reaction and to form well crystallized particles. Fluxed that have been used include alkali halides, such as KF, and alkali earth halides, such as $MgF_2$, and other non-transition metal halides, such as $AlF_3$. The laser pyrolysis approach with subsequent heat treatment does not require a flux.

Preferred phosphors include a host crystal or matrix and a small amount of activator. Generally, heavy metal ions or rare earth ions are used as activators. In some phosphors, co-activators are also added for charge compensation. For example, with zinc sulfide host crystals, group IIIa ions (e.g., $Al^{+3}$) or group VIIb ions (e.g., Mn) are used as co-activators. Co-activator ions help to form the luminescent center, while the luminescent spectrum is almost independent of the composition of the co-activator. Energy transfer processes are often used in commercial phosphors to enhance emission efficiency. The process is called sensitization of luminescence, and the energy donor is called a sensitizer. For example, the emission intensity of $Mn^{+2}$ activated sulfide phosphors are sensitized by $Pb^{+2}$, $Sb^{+3}$ and $Ce^{+3}$.

After the production of the particles by laser pyrolysis, generally it is desirable to heat treat the particles. Qualities of the oxide particles can be altered by heat treating the initially synthesized particles. For example, the crystallinity and/or the phase purity of the particles can be altered by heat treatment. The heat treatment can be performed in an oxidizing atmosphere, a reducing atmosphere or an inert atmosphere to produce the desired resulting particles.

In addition, starting with nanoscale or nanoscale oxide particles, corresponding sulfide particles can be formed by a thermal process. To form the sulfide, the oxide particles are heated while in contact with a sulfuring atmosphere formed by, for example, $H_2S$ or $CS_2$.

The resulting submicron and especially nanoscale metal/metalloid oxides and metal/metalloid sulfides have high luminosity. These particles are particularly useful for the production of electronic displays. Because of the small size of the particles, the fluorescence can be stimulated by lower voltages.

Particle Synthesis with a Reactant Flow

As described above, laser pyrolysis is a valuable tool for the production of submicron and nanoscale metal/metalloid oxide particles. Other chemical reaction synthesis methods for producing rare earth metal oxide particles using a flowing reactant stream in a gas flow are discussed above. The reactant delivery approaches described below can be adapted for producing metal/metalloid oxide particles with rare earth metals generally in flow reactant systems, with or without a light source. Laser pyrolysis is a preferred approach for synthesizing the rare earth metal oxide particles because laser pyrolysis produces highly uniform and high quality product particles.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce rare earth metal oxide particles in a particular apparatus are described below in the Examples. Furthermore, some general observations on the relationship between reaction conditions and the resulting particles can be made.

Increasing the light power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source in the reactant stream favors the production of particles with increased amounts of oxygen.

Reactant flow rate and velocity of the reactant gas stream are inversely related to particle size so that increasing the reactant gas flow rate or velocity tends to result in smaller particle sizes. Light power also influences particle size with increased light power favoring larger particle formation for lower melting materials and smaller particle formation for higher melting materials. Also, the growth dynamics of the particles have a significant influence on the size of the resulting particles. In other words, different forms of a product compound have a tendency to form different size particles from other phases under relatively similar conditions. Similarly, in multiphase regions at which populations of particles with different compositions are formed, each population of particles generally has its own characteristic narrow distribution of particle sizes.

Laser pyrolysis has become the standard terminology for chemical reactions driven by a intense light radiation with rapid quenching of product after leaving a narrow reaction region defined by the light. The name, however, is a misnomer in the sense that a strong, incoherent, but focused light beam can replace the laser. Also, the reaction is not a pyrolysis in the sense of a thermal pyrolysis. The laser pyrolysis reaction is not thermally driven by the exothermic combustion of the reactants. In fact, some laser pyrolysis reactions can be conducted under conditions where no visible flame is observed from the reaction.

Suitable host materials for the formation of phosphors include, for example, $ZnO$, $ZnS$, $Zn_2SiO_4$, $SrS$, $YBO_3$, $Y_2O_3$, $Al_2O_3$, $Y_3Al_5O_{12}$ and $BaMgAl_{14}O_{23}$. Preferred non-rare earth metals for activating phosphor particles as dopants include, for example, manganese, silver and lead. Preferred rare earth metals for forming metal oxide phosphors include, for example, europium, cerium, terbium and erbium. The reactant stream incorporates the appropriate blend of these metals.

Laser pyrolysis has been performed generally with gas/vapor phase reactants. Many metal precursor compounds can be delivered into the reaction chamber as a gas. Appropriate metal/metalloid precursor compounds for gaseous delivery generally include metal/metalloid compounds with reasonable vapor pressures, i.e., vapor pressures sufficient to get desired amounts of precursor gas/vapor into the reactant stream.

The vessel holding liquid or solid precursor compounds can be heated to increase the vapor pressure of the metal/metalloid precursor, if desired. Solid precursors generally are heated to produce a sufficient vapor pressure. A carrier gas can be bubbled through a liquid precursor to facilitate delivery of a desired amount of precursor vapor. Similarly, a carrier gas can be passed over the solid precursor to facilitate delivery of the precursor vapor.

Suitable solid zinc precursors for vapor delivery include, for example, zinc chloride ($ZnCl_2$). Suitable liquid zinc precursor compounds for vapor delivery include, for example, diethyl zinc ($Zn(C_2H_5)_2$) and dimethyl zinc ($Zn(CH_3)_2$). Suitable solid aluminum precursors for vapor delivery include, for example, aluminum chloride ($AlCl_3$), aluminum ethoxide ($Al(OC_2H_5)_3$), and aluminum isopropoxide ($Al[OCH(CH_3)_2]_3$). Suitable liquid, aluminum precursors for vapor delivery include, for example, aluminum s-butoxide ($Al(OC_4H_9)_3$). Suitable silicon precursors for vapor delivery include, for example, silicon tetrachloride ($SiCl_4$), trichlorosilane ($Cl_3HSi$), trichloromethyl silane $CH_3SiCl_3$, and tetraethoxysilane ($Si(OC_2H_5)_4$, also known as ethyl silane and tetraethyl silane). Suitable boron precursors include, for example, boron trichloride ($BCl_3$), diborane ($B_2H_6$), and $BH_3$. The chlorine in these representative precursor compounds generally can be replaced with other halogens, e.g., Br, I and F.

The use of exclusively gas phase reactants is somewhat limiting with respect to the types of precursor compounds that can be used conveniently. Thus, techniques have been developed to introduce aerosols containing metal/metalloid precursors into laser pyrolysis chambers. Improved aerosol delivery apparatuses for reaction systems are described further in U.S. Pat. No. 6,193,936 to Gardner et al., entitled "Reactant Delivery Apparatuses," incorporated herein by reference.

Using aerosol delivery apparatuses, solid precursor compounds can be delivered by dissolving the compounds in a solvent. Alternatively, powdered precursor compounds can be dispersed in a liquid/solvent for aerosol delivery. Liquid precursor compounds can be delivered as an aerosol from a neat liquid, a multiple liquid dispersion or a liquid solution. Aerosol reactants can be used to obtain a significant reactant throughput. A solvent/dispersant can be selected to achieve desired properties of the resulting solution/dispersion. Suitable solvents/dispersants include water, methanol, ethanol, isopropyl alcohol, other organic solvents and mixtures thereof. The solvent should have a desired level of purity such that the resulting particles have a desired purity level.

Some solvents, such as isopropyl alcohol, are significant absorbers of infrared light from a $CO_2$ laser such that no additional laser absorbing compound may be needed within the reactant stream if a $CO_2$ laser is used as a light source.

If aerosol precursors are formed with a solvent present, the solvent preferably is rapidly evaporated by the light beam in the reaction chamber such that a gas phase reaction can take place. Thus, the fundamental features of the laser pyrolysis reaction are unchanged by the presence of an aerosol. Nevertheless, the reaction conditions are affected by the presence of the aerosol. Below in the Examples, conditions are described for the production of nanoscale metal oxide particles using aerosol precursors in a particular laser pyrolysis reaction chamber. Thus, the parameters associated with aerosol reactant delivery can be explored further based on the description below.

A number of suitable solid, non-rare earth metal/metalloid precursor compounds can be delivered as an aerosol from solution. For example, zinc chloride ($ZnCl_2$) and zinc nitrate ($Zn(NO_3)_2$) are soluble in water and some organic solvents, such as isopropyl alcohol. Aluminum nitrate ($Al(NO_3)_3$) is soluble in water. Barium chloride ($BaCl_2$) and barium nitrate ($Ba(NO_3)_2$) are soluble in water. Magnesium nitrate ($Mg(NO_3)_2$) is somewhat soluble in water and is freely soluble in alcohol, and magnesium chloride ($MgCl_2$) is somewhat soluble in water and alcohols.

Similarly, a number or rare earth metal precursors are suitable for aerosol delivery. For example, cerous chloride ($CeCl_3$) is soluble in water. Europium nitrate ($Eu(NO_3)_3$) is soluble in water. Gadolinium nitrate ($Gd(NO_3)_3$) is soluble in water. Terbium chloride ($TbCl_3$) and erbium chloride ($ErCl_3$) are soluble in water.

The precursor compounds for aerosol delivery are dissolved in a solution preferably with a concentration greater than about 0.5 molar. Generally, the greater the concentration of precursor in the solution the greater the throughput of reactant through the reaction chamber. As the concentration increases, however, the solution can become more viscous such that the aerosol may have droplets with larger sizes than desired. Thus, selection of solution concentration can involve a balance of factors in the selection of a preferred solution concentration.

Preferred secondary reactants serving as an oxygen source include, for example, $O_2$, CO, $H_2O$, $CO_2$, $O_3$ and mixtures thereof. Molecular oxygen can be supplied as air. The secondary reactant compound should not react significantly with the metal/metalloid precursor prior to entering the reaction zone since this generally would result in the formation of large particles. If the reactants are spontaneously reactive, the metal/metalloid precursor and the secondary reactant can be delivered in separate nozzles into the reaction chamber such that they are combined just prior to reaching the light beam. If the metal/metalloid precursors includes oxygen, a secondary reactant may not be needed to supply oxygen.

Laser pyrolysis can be performed with a variety of optical frequencies, using either a laser or other strong focused light source. Preferred light sources operate in the infrared portion of the electromagnetic spectrum. $CO_2$ lasers are particularly preferred sources of light. Infrared absorbers for inclusion in the reactant stream include, for example, $C_2H_4$, isopropyl alcohol, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the pyrolysis.

Preferably, the energy absorbed from the light beam increases the temperature at a tremendous rate, many times the rate that heat generally would be produced by exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction. Thus, while the light driven process is referred to as laser pyrolysis, it is not a thermal process even though traditional pyrolysis is a thermal process.

An inert shielding gas can be used to reduce the amount of reactant and product molecules contacting the reactant chamber components. Inert gases can also be introduced into the reactant stream as a carrier gas and/or as a reaction moderator. Appropriate inert gases include, for example, Ar, He and $N_2$.

An appropriate laser pyrolysis apparatus generally includes a reaction chamber isolated from the ambient environment. A reactant inlet connected to a reactant delivery apparatus produces a reactant stream with a gas flow through the reaction chamber. A light beam path intersects the reactant stream at a reaction zone. The reactant/product stream continues after the reaction zone to an outlet, where the reactant/product stream exits the reaction chamber and passes into a collection apparatus. Generally, the light source, such as a laser, is located external to the reaction chamber, and the light beam enters the reaction chamber through an appropriate window.

Referring to FIG. 1, a particular embodiment 100 of a laser pyrolysis system involves a reactant delivery apparatus 102, reaction chamber 104, shielding gas delivery apparatus 106, collection apparatus 108 and light source 110. A first reaction delivery apparatus described below can be used to deliver exclusively gaseous reactants. An alternative reactant delivery apparatus is described for delivery of one or more reactants as an aerosol.

Referring to FIG. 2, a first embodiment 112 of reactant delivery apparatus 102 includes a source 120 of a precursor compound. For liquid or solid reactants, a carrier gas from one or more carrier gas sources 122 can be introduced into precursor source 120 to facilitate delivery of the reactant. Precursor source 120 can be a liquid holding container, a solid precursor delivery apparatus or other suitable container. The carrier gas from carrier gas source 122 preferably is either an infrared absorber and/or an inert gas.

The gases from precursor source 120 are mixed with gases from infrared absorber source 124, inert gas source 126 and/or secondary reactant source 128 by combining the gases in a single portion of tubing 130. The gases are combined a sufficient distance from reaction chamber 104 such that the gases become well mixed prior to their entrance into reaction chamber 104. The combined gas in tube 130 passes through a duct 132 into channel 134, which is in fluid communication with reactant inlet 256 (FIG. 1).

A second reactant can be supplied from second reactant source 138, which can be a liquid reactant delivery apparatus, a solid reactant delivery apparatus, a gas cylinder or other suitable container or containers. As shown in FIG. 2, second reactant source 138 delivers a second reactant to duct 132 by way of tube 130. Alternatively, mass flow controllers 146 can be used to regulate the flow of gases within the reactant delivery system of FIG. 2. In alternative embodiments, the second reactant can be delivered through a second duct for delivery into the reactant chamber through a second channel such that the reactants do not mix until they are in the reaction chamber. A laser pyrolysis apparatus with a plurality of reactant delivery nozzles is described further in copending and commonly assigned U.S. patent application Ser. No. 09/266,202 to Reitz et al., entitled "Zinc Oxide Particles," incorporated herein by reference.

As noted above, the reactant stream can include one or more aerosols. The aerosols can be formed within reaction chamber 104 or outside of reaction chamber 104 prior to injection into reaction chamber 104. If the aerosols are produced prior to injection into reaction chamber 104, the aerosols can be introduced through reactant inlets comparable to those used for gaseous reactants, such as reactant inlet 134 in FIG. 2.

Figure 3:
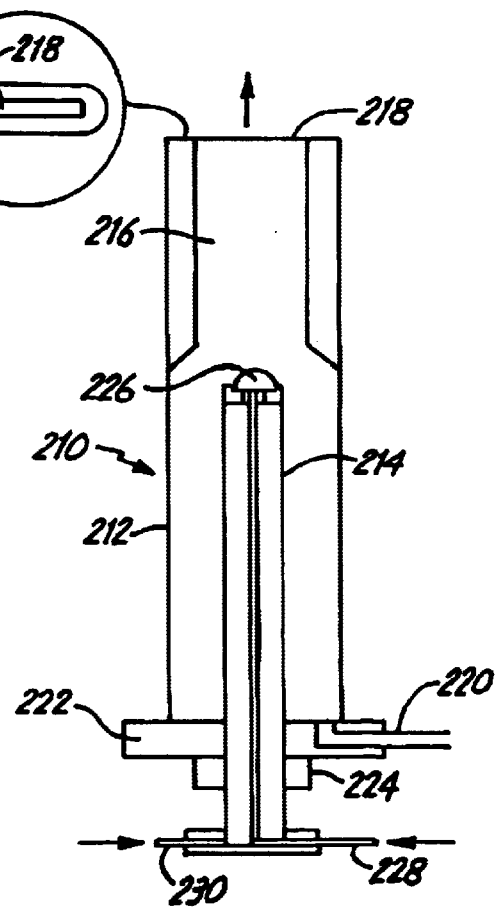
FIG. 3 is a schematic, sectional view of a reactant delivery apparatus for the delivery of an aerosol reactant to the laser pyrolysis apparatus of FIG. 1, the cross section being taken through the center of the apparatus.

Referring to FIG. 3, embodiment 210 of the reactant supply system 102 can be used to supply an aerosol to duct 132. Reactant supply system 210 includes an outer nozzle 212 and an inner nozzle 214. Outer nozzle 212 has an upper channel 216 that leads to a rectangular outlet 218 at the top of outer nozzle 212, as shown in the insert in FIG. 3. Rectangular outlet 218 has selected dimensions to produce a reactant stream of desired expanse within the reaction chamber. Outer nozzle 212 includes a drain tube 220 in base plate 222. Drain tube 220 is used to remove condensed aerosol from outer nozzle 212. Inner nozzle 214 is secured to outer nozzle 212 at fitting 224.

The top of inner nozzle 214 preferably is a twin orifice internal mix atomizer 226. Liquid is fed to the atomizer through tube 228, and gases for introduction into the reaction chamber are fed to the atomizer through tube 230. Interaction of the gas with the liquid assists with droplet formation.

Referring to FIG. 1, the reaction chamber 104 includes a main chamber 250. Reactant supply system 102 connects to the main chamber 250 at injection nozzle 252. Reaction chamber 104 can be heated to a surface temperature above the dew point of the mixture of reactants and inert components at the pressure in the apparatus.

The end of injection nozzle 252 has an annular opening 254 for the passage of inert shielding gas, and a reactant inlet 256 (left lower insert) for the passage of reactants to form a reactant stream in the reaction chamber. Reactant inlet 256 preferably is a slit, as shown in the lower inserts of FIG. 1. Annular opening 254 has, for example, a diameter of about 1.5 inches and a width along the radial direction from about $\frac{1}{8}$ in to about $\frac{1}{16}$ in. The flow of shielding gas through annular opening 254 helps to prevent the spread of the reactant gases and product particles throughout reaction chamber 104.

Tubular sections 260, 262 are located on either side of injection nozzle 252. Tubular sections 260, 262 include, for example, ZnSe windows 264, 266, respectively. Windows 264, 266 are about 1 inch in diameter. Windows 264, 266 are preferably cylindrical lenses with a focal length equal to the distance between the center of the chamber to the surface of the lens to focus the light beam to a point just below the center of the nozzle opening. Windows 264, 266 preferably have an antireflective coating. Appropriate ZnSe lenses are available from Laser Power Optics, San Diego, Calif. Tubular sections 260, 262 provide for the displacement of windows 264, 266 away from main chamber 250 such that windows 264, 266 are less likely to be contaminated by reactants and/or products. Window 264, 266 are displaced, for example, about 3 cm from the edge of the main chamber 250.

Windows 264, 266 are sealed with a rubber o-ring to tubular sections 260, 262 to prevent the flow of ambient air into reaction chamber 104. Tubular inlets 268, 270 provide for the flow of shielding gas into tubular sections 260, 262 to reduce the contamination of windows 264, 266. Tubular inlets 268, 270 are connected to shielding gas delivery apparatus 106.

Figure 2:
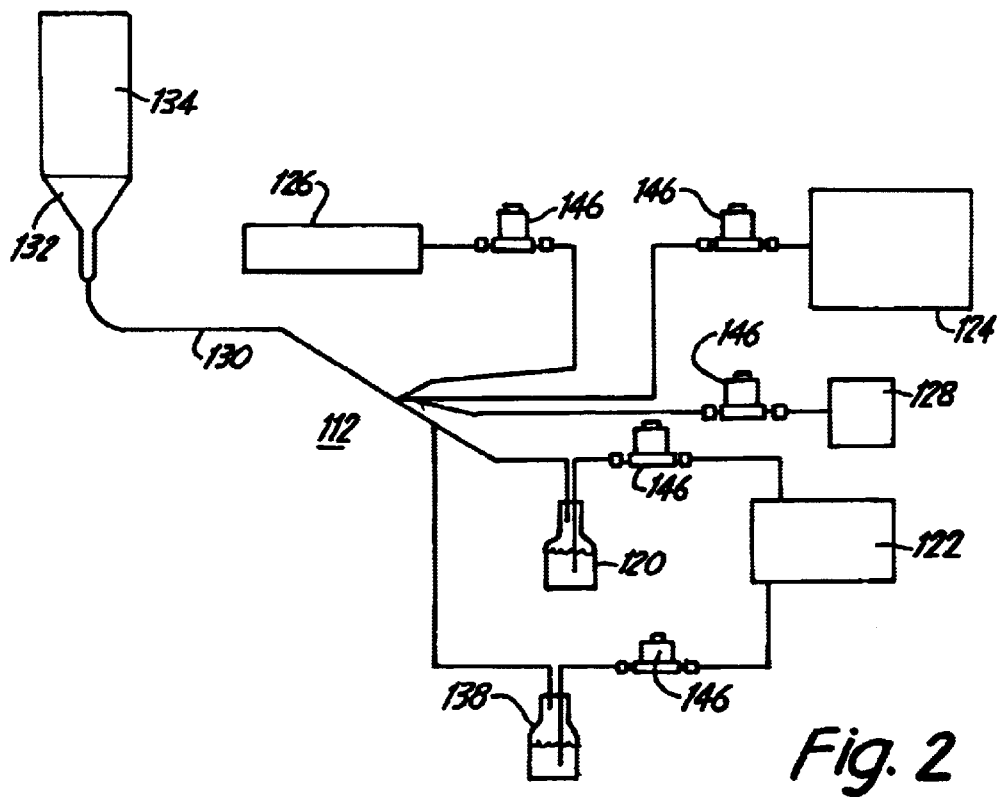
FIG. 2 is a schematic, side view of a reactant delivery apparatus for the delivery of vapor reactants to the laser pyrolysis apparatus of FIG. 1.

Referring to FIG. 1, shielding gas delivery system 106 includes inert gas source 280 connected to an inert gas duct 282. Inert gas duct 282 flows into annular channel 284 leading to annular opening 254. A mass flow controller 286 regulates the flow of inert gas into inert gas duct 282. If reactant delivery system 112 of FIG. 2 is used, inert gas source 126 can also function as the inert gas source for duct 282, if desired. Referring to FIG. 1, inert gas source 280 or a separate inert gas source can be used to supply inert gas to tubes 268, 270. Flow to tubes 268, 270 preferably is controlled by a mass flow controller 288.

Light source 110 is aligned to generate a light beam 300 that enters window 264 and exits window 266. Windows 264, 266 define a light path through main chamber 250 intersecting the flow of reactants at reaction zone 302. After exiting window 266, light beam 300 strikes power meter 304, which also acts as a beam dump. An appropriate power meter is available from Coherent Inc., Santa Clara, Calif. Light source 110 can be a laser or an intense conventional light source such as an arc lamp. Preferably, light source 110 is an infrared laser, especially a CW $CO_2$ laser such as an 1800 watt maximum power output laser available from PRC Corp., Landing, N.J.

Reactants passing through reactant inlet 256 in injection nozzle 252 initiate a reactant stream. The reactant stream passes through reaction zone 302, where reaction involving the metal/metalloid precursor compounds takes place. Heating of the gases in reaction zone 302 is extremely rapid, roughly on the order of $10^5$ degree C./sec depending on the specific conditions. The reaction is rapidly quenched upon leaving reaction zone 302, and particles 306 are formed in the reactant/product stream. The nonequilibrium nature of the process allows for the production of nanoparticles with a highly uniform size distribution and structural homogeneity.

The path of the reactant stream continues to collection nozzle 310. Collection nozzle 310 has a circular opening 312, as shown in the upper insert of FIG. 1. Circular opening 312 feeds into collection system 108.

The chamber pressure is monitored with a pressure gauge 320 attached to the main chamber. The preferred chamber pressure for the production of the desired oxides generally ranges from about 80 Torr to about 650 Torr.

Collection system 108 preferably includes a curved channel 330 leading from collection nozzle 310. Because of the small size of the particles, the product particles follow the flow of the gas around curves. Collection system 108 includes a filter 332 within the gas flow to collect the product particles. Due to curved section 330, the filter is not supported directly above the chamber. A variety of materials such as Teflon® (polytetrafluoroethylene), glass fibers and the like can be used for the filter as long as the material is inert and has a fine enough mesh to trap the particles. Preferred materials for the filter include, for example, a glass fiber filter from ACE Glass Inc., Vineland, N.J. and cylindrical Nomex® filters from AF Equipment Co., Sunnyvale, Calif.

Pump 334 is used to maintain collection system 108 at a selected pressure. It may be desirable to flow the exhaust of the pump through a scrubber 336 to remove any remaining reactive chemicals before venting into the atmosphere.

The pumping rate is controlled by either a manual needle valve or an automatic throttle valve 338 inserted between pump 334 and filter 332. As the chamber pressure increases due to the accumulation of particles on filter 332, the manual valve or the throttle valve can be adjusted to maintain the pumping rate and the corresponding chamber pressure.

The apparatus is controlled by a computer 350. Generally, the computer controls the light source and monitors the pressure in the reaction chamber. The computer can be used to control the flow of reactants and/or the shielding gas.

The reaction can be continued until sufficient particles are collected on filter 332 such that pump 334 can no longer maintain the desired pressure in the reaction chamber 104 against the resistance through filter 332. When the pressure in reaction chamber 104 can no longer be maintained at the desired value, the reaction is stopped, and filter 332 is removed. With this embodiment, about 1–300 grams of particles can be collected in a single run before the chamber pressure can no longer be maintained. A single run generally can last up to about 10 hours depending on the reactant delivery system, the type of particle being produced and the type of filter being used.

Figure 4:
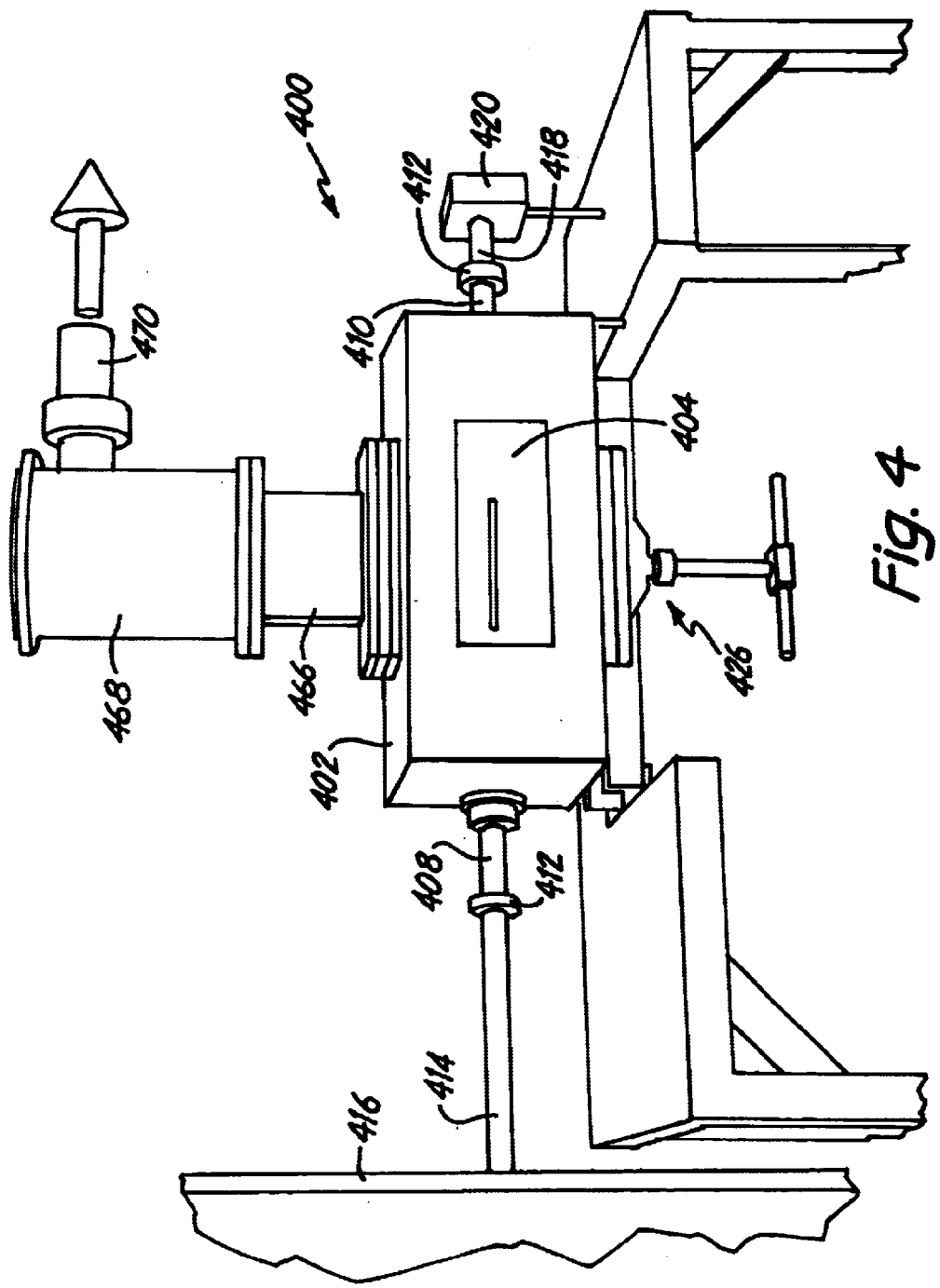
FIG. 4 is a perspective view of an alternative embodiment of a laser pyrolysis apparatus.

An alternative embodiment of a laser pyrolysis apparatus is shown in FIG. 4. Laser pyrolysis apparatus 400 includes a reaction chamber 402. The reaction chamber 402 has a shape of a rectangular parallelapiped. Reaction chamber 402 extends with its longest dimension along the laser beam. Reaction chamber 402 has a viewing window 404 at its side, such that the reaction zone can be observed during operation.

Reaction chamber 402 has tubular extensions 408, 410 that define an optical path through the reaction chamber. Tubular extension 408 is connected with a seal to a cylindrical lens 412. Tube 414 connects laser 416 or other optical source with lens 412. Similarly, Tubular extension 410 is connected with a seal to tube 418, which further leads to beam dump/light meter 420. Thus, the entire light path from laser 416 to beam dump 420 is enclosed.

Figure 5:
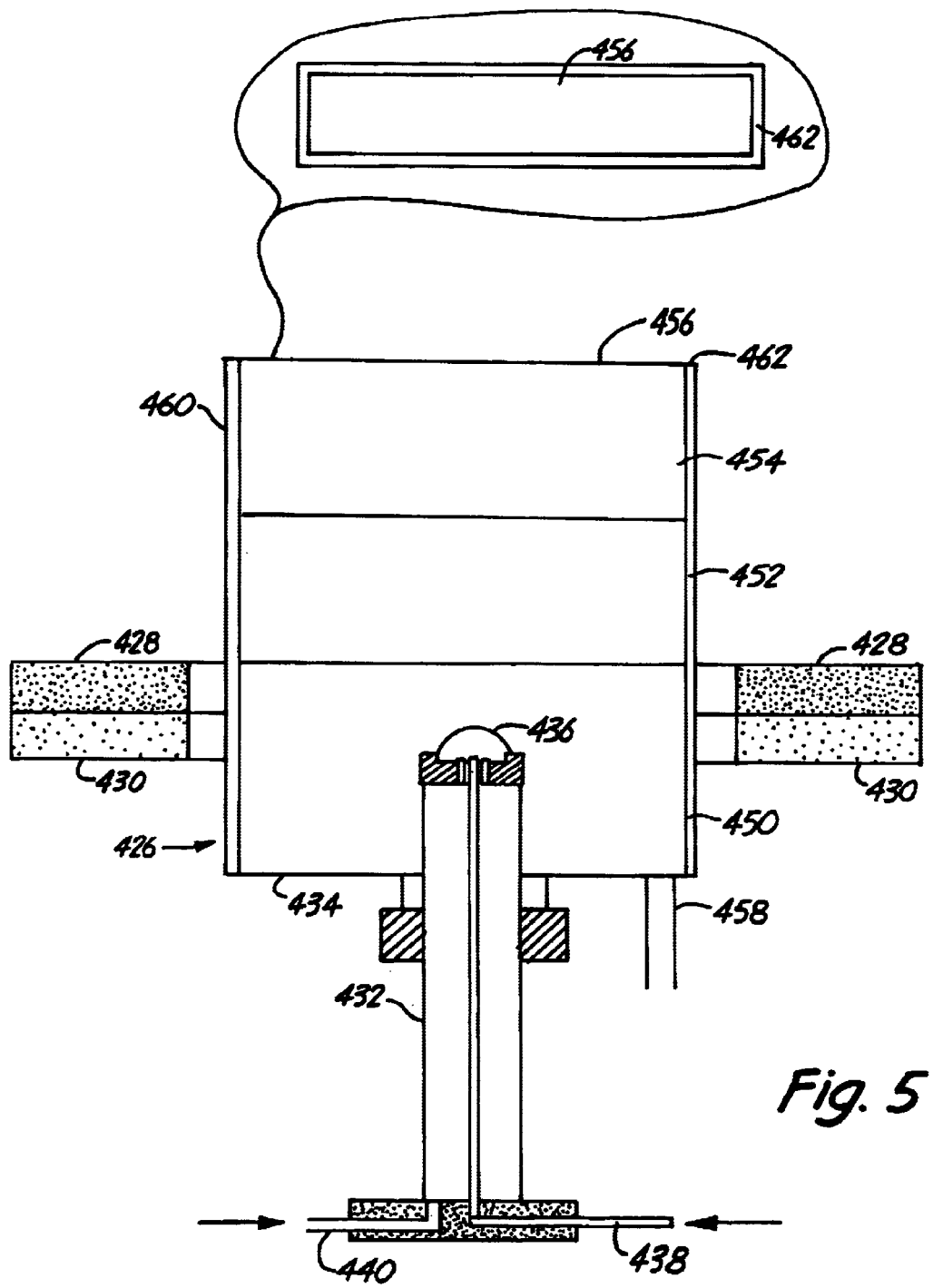
FIG. 5 is a sectional view of the inlet nozzle of the alternative laser pyrolysis apparatus of FIG. 4, the cross section being taken along the length of the nozzle through its center.
Figure 6:
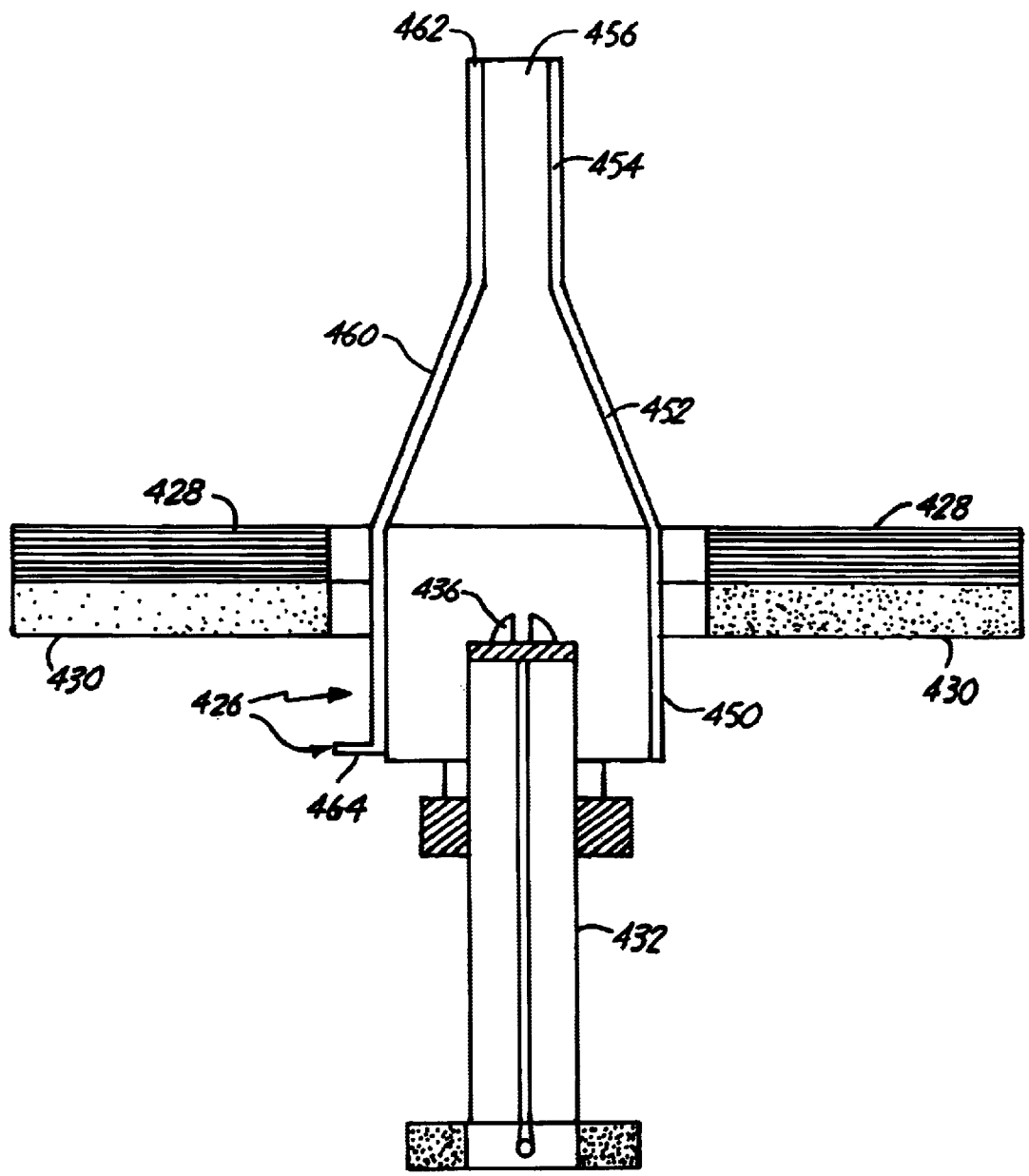
FIG. 6 is a sectional view of the inlet nozzle of the alternative laser pyrolysis apparatus of FIG. 4, the cross section being taken along the width of the nozzle through its center.

Inlet nozzle 426 connects with reaction chamber 402 at its lower surface 428. Inlet nozzle 426 includes a plate 430 that bolts into lower surface 428 to secure inlet nozzle 426. Referring to sectional views in FIGS. 5 and 6, inlet nozzle 426 includes an inner nozzle 432 and an outer nozzle 434. Inner nozzle 432 preferably has a twin orifice internal mix atomizer 436 at the top of the nozzle. Suitable gas atomizers are available from Spraying Systems, Wheaton, Ill. The twin orifice internal mix atomizer 436 has a fan shape to produce a thin sheet of aerosol and gaseous precursors. Liquid is fed to the atomizer through tube 438, and gases for introduction into the reaction chamber are fed to the atomizer through tube 440. Interaction of the gas with the liquid assists with droplet formation.

Outer nozzle 434 includes a chamber section 450, a funnel section 452 and a delivery section 454. Chamber section 450 holds the atomizer of inner nozzle 432. Funnel section 452 directs the aerosol and gaseous precursors into delivery section 454. Delivery section 450 leads to an about 3 inch by 0.5 inch rectangular outlet 456, shown in the insert of FIG. 5. Outer nozzle 434 includes a drain 458 to remove any liquid that collects in the outer nozzle. Outer nozzle 434 is covered by an outer wall 460 that forms an shielding gas opening 462 surrounding outlet 456. Inert gas is introduced through inlet 464.

Referring to FIG. 4, exit nozzle 466 connects to apparatus 400 at the top surface of reaction chamber 402. Exit nozzle 466 leads to filter chamber 468. Filter chamber 468 connects with pipe 470 which leads to a pump. A cylindrical filter is mounted at the opening to pipe 470. Suitable cylindrical filters are described above.

Another alternative design of a laser pyrolysis apparatus has been described in U.S. Pat. No. 5,958,348 to Bi et al., entitled "Efficient Production of Particles by Chemical Reaction," incorporated herein by reference. This alternative design is intended to facilitate production of commercial quantities of particles by laser pyrolysis. Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference.

In one preferred embodiment of a commercial capacity laser pyrolysis apparatus, the reaction chamber and reactant inlet are elongated significantly along the light beam to provide for an increase in the throughput of reactants and products. The original design of the apparatus was based on the introduction of purely gaseous reactants. The embodiments described above for the delivery of aerosol reactants can be adapted for the elongated reaction chamber design. Additional embodiments for the introduction of an aerosol with one or more aqrosol generators into an elongated reaction chamber are described in commonly assigned and copending U.S. patent application Ser. No. 09/188,670, now U.S. Pat. No. 6,193,936 to Gardner et al., entitled "Reactant Delivery Apparatuses," incorporated herein by reference.

In general, the laser pyrolysis apparatus with the elongated reaction chamber and reactant inlet is designed to reduce contamination of the chamber walls, to increase the production capacity and to make efficient use of resources. To accomplish these objectives, the elongated reaction chamber provides for an increased throughput of reactants and products without a corresponding increase in the dead volume of the chamber. The dead volume of the chamber can become contaminated with unreacted compounds and/or reaction products. Furthermore, an appropriate flow of shielding gas confines the reactants and products within a flow stream through the reaction chamber. The high throughput of reactants makes efficient use of the laser energy.

Figure 7:
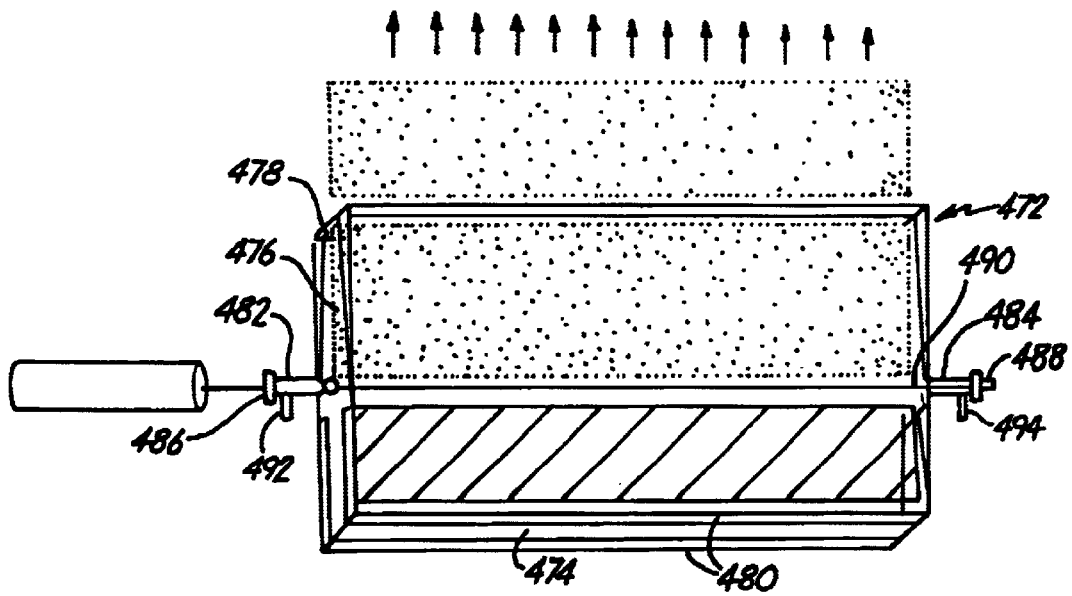
FIG. 7 is a perspective view of an embodiment of an elongated reaction chamber for performing laser pyrolysis.

The design of the improved reaction chamber 472 is shown schematically in FIG. 7. A reactant inlet 474 leads to main chamber 476. Reactant inlet 474 conforms generally to the shape of main chamber 476. Main chamber 476 includes an outlet 478 along the reactant/product stream for removal of particulate products, any unreacted gases and inert gases. Shielding gas inlets 480 are located on both sides of reactant inlet 474. Shielding gas inlets are used to form a blanket of inert gases on the sides of the reactant stream to inhibit contact between the chamber walls and the reactants or products. The dimensions of elongated main chamber 476 and reactant inlet 474 preferably are designed for high efficiency particle production. Reasonable lengths for reactant inlet 474 for the production of ceramic nanoparticles, when used with a 1800 watt $CO_2$ laser, are from about 5 mm to about 1 meter.

Tubular sections 482, 484 extend from the main chamber 476. Tubular sections 482, 484 hold windows 486, 488 to define a light beam path 490 through the reaction chamber 472. Tubular sections 482, 484 can include inert gas inlets 492, 494 for the introduction of inert gas into tubular sections 482, 484.

The improved reaction system includes a collection apparatus to remove the nanoparticles from the reactant stream. The collection system can be designed to collect particles in a batch mode with the collection of a large quantity of particles prior to terminating production. A filter or the like can be used to collect the particles in batch mode. Alternatively, the collection system can be designed to run in a continuous production mode by switching between different particle collectors within the collection apparatus or by providing for removal of particles without exposing the collection system to the ambient atmosphere. A preferred embodiment of a collection apparatus for continuous particle production is described in copending and commonly assigned U.S. patent application Ser. No. 09/107,729, now U.S. Pat. No. 6,270,732 to Gardner et al., entitled "Particle Collection Apparatus And Associated Methods," incorporated herein by reference.

B. Heat Processing

Significant properties of submicron and nanoscale particles can be modified by heat processing. Suitable starting material for the heat treatment include particles produced by laser pyrolysis. In addition, particles used as starting material for a heat treatment process can have been subjected to one or more prior heating steps under different conditions. For the heat processing of particles formed by laser pyrolysis, the additional heat processing can improve/alter the crystallinity, remove contaminants, such as elemental carbon, and/or alter the stoichiometry, for example, by incorporation of additional oxygen or removal of oxygen.

Of particular interest, mixed metal/metalloid oxides formed by laser pyrolysis can be subjected to a heat processing step. This heat processing converts these particles into desired high quality crystalline forms. In preferred embodiments, the heat treatment substantially maintains the submicron or nanoscale size and size uniformity of the particles from laser pyrolysis. In other words, particle size is not compromised significantly by thermal processing.

The particles are heated in an oven or the like to provide generally uniform heating. The processing conditions generally are mild, such that significant amounts of particle sintering does not occur. Thus, the temperature of heating preferably is low relative to the melting point of the starting material and the product material.

The atmosphere over the particles can be static, or gases can be flowed through the system. The atmosphere for the heating process can be an oxidizing atmosphere, a reducing atmosphere or an inert atmosphere. In particular, for conversion of amorphous particles to crystalline particles or from one crystalline structure to a different crystalline structure of essentially the same stoichiometry, the atmosphere generally can be inert.

Appropriate oxidizing gases include, for example, $O_2$, $O_3$, CO, $CO_2$, and combinations thereof. The $O_2$ can be supplied as air. Reducing gases include, for example, $H_2$ and $NH_3$. A reducing atmosphere is used for the heat treatment of $BaMgAl_{14}O_{23}$ doped with europeum since the europeum is generally supplied in a +3 state while it operates as the phosphor activator in a +2 state. Therefore, the have complete incorporation and improves phase uniformity, the particles generally are heat treated under a reducing atmosphere. Oxidizing gases or reducing gases optionally can be mixed with inert gases such as Ar, He and $N_2$. When inert gas is mixed with the oxidizing/reducing gas, the gas mixture can include from about 1 percent oxidizing/reducing gas to about 99 percent oxidizing/reducing gas, and more preferably from about 5 percent oxidizing/reducing gas to about 99 percent oxidizing/reducing gas. Alternatively, either essentially pure oxidizing gas, pure reducing gas or pure inert gas can be used, as desired. Care must be taken with respect to the prevention of explosions when using highly concentrated reducing gases.

The precise conditions can be altered to vary the type of metal/metalloid oxide particles that are produced. For example, the temperature, time of heating, heating and cooling rates, the surrounding gases and the exposure conditions with respect to the gases can all be selected to produce desired product particles. Generally, while heating under an oxidizing atmosphere, the longer the heating period the more oxygen that is incorporated into the material, prior to reaching equilibrium. Once equilibrium conditions are reached, the overall conditions determine the crystalline phase of the powders.

Figure 8:
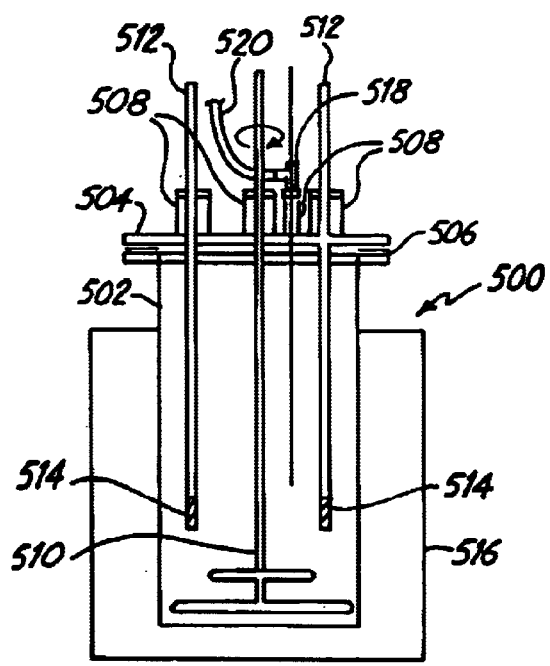
FIG. 8 is a schematic, sectional view of an apparatus for heat treating nanoparticles, in which the section is taken through the center of the apparatus.

A variety of ovens or the like can be used to perform the heating. An example of an apparatus 500 to perform this processing is displayed in FIG. 8. Apparatus 500 includes a jar 502, which can be made from glass or other inert material, into which the particles are placed. Suitable glass reactor jars are available from Ace Glass (Vineland, N.J.). For higher temperatures alloy jars can be used to replace the glass jars. The top of glass jar 502 is sealed to a glass cap 504, with a Teflon® gasket 506 between jar 502 and cap 504. Cap 504 can be held in place with one or more clamps. Cap 504 includes a plurality of ports 508, each with a Teflon® bushing. A multiblade stainless steel stirrer 510 preferably is inserted through a central port 508 in cap 504. Stirrer 510 is connected to a suitable motor.

One or more tubes 512 are inserted through ports 508 for the delivery of gases into jar 502. Tubes 512 can be made from stainless steel or other inert material. Diffusers 514 can be included at the tips of tubes 512 to disburse the gas within jar 502. A heater/furnace 516 generally is placed around jar 502. Suitable resistance heaters are available from Glas-col (Terre Haute, Ind.). One port preferably includes a T-connection 518. The temperature within jar 502 can be measured with a thermocouple 518 inserted through T-connection 518. T-connection 518 can be further connected to a vent 520. Vent 520 provides for the venting of gas circulated through jar 502. Preferably vent 520 is vented to a fume hood or alternative ventilation equipment.

Preferably, desired gases are flowed through jar 502. Tubes 512 generally are connected to an oxidizing gas source and/or an inert gas source. Oxidizing gas, inert gas or a combination thereof to produce the desired atmosphere are placed within jar 502 from the appropriate gas source(s). Various flow rates can be used. The flow rate preferably is between about 1 standard cubic centimeters per minute (sccm) to about 1000 sccm and more preferably from about 10 sccm to about 500 sccm. The flow rate generally is constant through the processing step, although the flow rate and the composition of the gas can be varied systematically over time during processing, if desired. Alternatively, a static gas atmosphere can be used.

Figure 9:
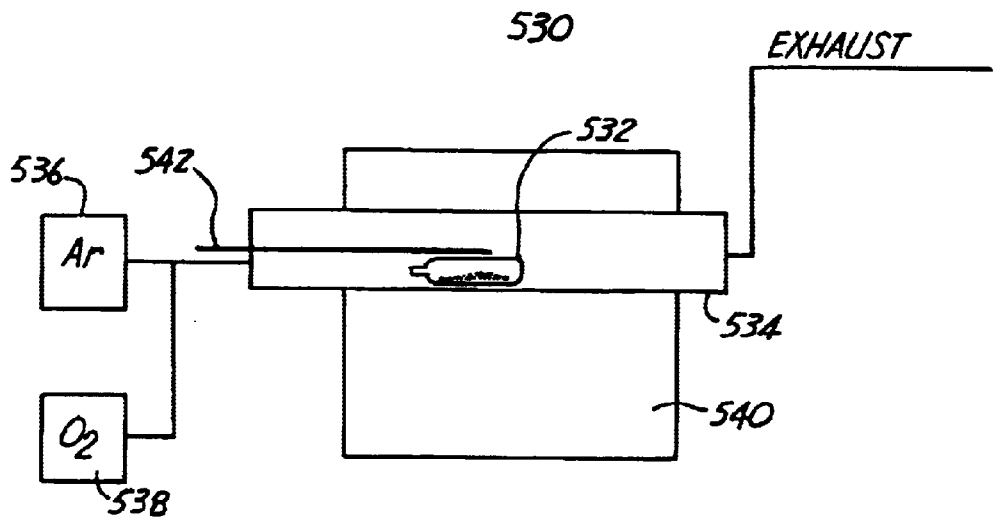
FIG. 9 is a schematic, sectional view of an oven for heating nanoparticles, in which the section is taken through the center of a tube.

An alternative apparatus 530 for the heat treatment of modest quantities of nanoparticles is shown in FIG. 9. The particles are placed within a boat 532 or the like within tube 534. Tube 534 can be produced from, for example, quartz, alumina or zirconia. Preferably, the desired gases are flowed through tube 534. Gases can be supplied for example from inert gas source 536 or oxidizing gas source 538.

Tube 534 is located within oven or furnace 540. Oven 540 can be adapted from a commercial furnace, such as Mini-Mite™ 1100° C. Tube Furnace from Lindberg/Blue M, Asheville, N.C. Oven 540 maintains the relevant portions of the tube at a relatively constant temperature, although the temperature can be varied systematically through the processing step, if desired. The temperature can be monitored with a thermocouple 542.

Preferred temperature ranges depend on the starting material and the target product metal/metalloid oxide. For the processing of nanoscale rare earth phosphors, the temperature preferably ranges from about 400° C. to about 1400° C. The particular temperatures will depend on the specific material being processed. The heating generally is continued for greater than about 5 minutes, and typically is continued for from about 10 minutes to about 120 hours, in most circumstances from about 10 minutes to about 5 hours. Preferred heating times also will depend on the particular starting material and target product. Some empirical adjustment may be helpful to produce the conditions appropriate for yielding a desired material. Typically, submicron and nanoscale powders can be processed at lower temperatures while still achieving the desired reaction. The use of mild conditions avoids significant interparticle sintering resulting in larger particle sizes. To prevent particle growth, the particles preferably are heated for short periods of time at high temperatures or for longer periods of time at lower temperatures. Some controlled sintering of the particles can be performed at somewhat higher temperatures to produce slightly larger, average particle diameters.

As noted above, heat treatment can be used to perform a variety of desirable transformations for nanoparticles. For example, the conditions to convert crystalline $VO_2$ to orthorbonibic $V_2O_5$ and 2-D crystalline $V_2O_5$, and amorphous $V_2O_5$ to orthorhombic $V_2O_5$ and 2-D crystalline $Y_2O_5$ are describe in U.S. Pat. No. 5,989,514, to Bi St al., entitled "Processing of Vanadium Oxide Particles With Heat," incorporated herein by reference. Conditions for the removal of carbon coatings from metal oxide nanoparticles is described in copending and commonly assigned U.S. patent application Ser. No. 09/123,255 now U.S. Pat. No. 6,387,531, entitled "Metal (Silicon) Oxide/Carbon Composite Particles," incorporated herein by reference. The incorporation of lithium from a lithium salt into metal oxide nanoparticles in a beat treatment process is described in copending and commonly assigned U.S. patent application Ser. No. 09/311,506, now U.S. Pat. No. 6,391,494 to Reitz St al., entitled "Metal Vanadium Oxide Particles," and copending and commonly assigned U.S. patent application Ser. No. 09/334,203, now U.S. Pat. No. 6,482,374 to Kumar et al., entitled "Reaction Methods for Producing Ternary Particles," both of which are incorporated herein by reference.

As noted above, metal/metalloid oxide particles can be converted to the corresponding metal/metalloid sulfides by heating the oxide in a sulfurizing atmosphere formed by a $H_2S$ gas atmosphere or a $CS_2$ vapor atmosphere. The metal/metalloid oxides can be heated gently to form the sulfide. Since the sulfides are extremely reactive, the heating can be very gentile, generally less than about 500° C., preferably less than about 500° C. and even more preferably less than about 300° C. Suitable concentrations of sulfurizing agent and reaction times can be evaluated empirically by examining the x-ray diffractograms of the resulting materials or by performing an elemental analysis.

Particle Properties

A collection of particles of interest generally has an average diameter for the primary particles of less than about 1000 nm, in most embodiments less than about 500 nm, in other embodiments from about 2 nm to about 100 nm, in further embodiments from about 3 nm to about 75 nm, and still other embodiments from about 5 nm to about 50 nm. In some preferred embodiments, the average particle sizes range from about 15 nm to about 100 nm, or from about 15 nm to about 50 nm. A person of ordinary skill in the art will recognize that average diameter ranges within these specific ranges are also contemplated and are within the present disclosure. Particle diameters generally are evaluated by transmission electron microscopy. Diameter measurements on particles with asymmetries are based on an average of length measurements along the principle axes of the particle.

The primary particles usually have a roughly spherical gross appearance. With some precursors the particles produced by laser pyrolysis are porous and less spherical. Mild heat treatment of these porous particles leads to a more spherical solid particle. Generally, after heat treatment, the particles may be less spherical. Upon closer examination, crystalline particles generally have facets corresponding to the underlying crystal lattice. Nevertheless, crystalline primary particles tend to exhibit growth in laser pyrolysis that is roughly equal in the three physical dimensions to give a gross spherical appearance. Amorphous particles generally have an even more spherical aspect. In some embodiments, 95 percent of the primary particles, and preferably 99 percent, have ratios of the dimension along the major axis to the dimension along the minor axis less than about 2.

Because of their small size, the primary particles tend to form loose agglomerates due to van der Waals and other electromagnetic forces between nearby particles. These agglomerates can be dispersed to a significant degree, if desired. Even though the particles form loose agglomerates, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, vanadium oxide nanoparticles can exhibit surprisingly high energy densities in lithium batteries, as described in U.S. Pat. No. 5,952,125 to Bi et al., entitled "Batteries With Electroactive Nanoparticles," incorporated herein by reference.

The primary particles preferably have a high degree of uniformity in size. Laser pyrolysis, as described above, generally results in particles having a very narrow range of particle diameters. Furthermore, heat processing under suitably mild conditions does not alter the very narrow range of particle diameters. With aerosol delivery of reactants for laser pyrolysis, the distribution of particle diameters is particularly sensitive to the reaction conditions. Nevertheless, if the reaction conditions are properly controlled, a very narrow distribution of particle diameters can be obtained with an aerosol delivery system. As determined from examination of transmission electron micrographs, the primary particles generally have a distribution in sizes such that at least about 95 percent, and preferably 99 percent, of the primary particles have a diameter greater than about 40 percent of the average diameter and less than about 225 percent of the average diameter. Preferably, the primary particles have a distribution of diameters such that at least about 95 percent, and preferably 99 percent, of the primary particles have a diameter greater than about 45 percent of the average diameter and less than about 200 percent of the average diameter.

Furthermore, in preferred embodiments no primary particles have an average diameter greater than about 5 times the average diameter and preferably 4 times the average diameter, and more preferably 3 times the average diameter. In other words, the particle size distribution effectively does not have a tail indicative of a small number of particles with significantly larger sizes. This is a result of the small reaction region and corresponding rapid quench of the particles. An effective cut off in the tail of the size distribution indicates that there are less than about 1 particle in $10^6$ have a diameter greater than a specified cut off value above the average diameter. Narrow size distributions, lack of a tail in the distributions and the roughly spherical morphology can be exploited in a variety of applications.

In addition, the nanoparticles generally have a very high purity level. The nanoparticles produced by the above described methods are expected to have a purity greater than the reactants because the laser pyrolysis reaction and, when applicable, the crystal formation process tends to exclude contaminants from the particle. Furthermore, crystalline nanoparticles produced by laser pyrolysis have a high degree of crystallinity. Similarly, the crystalline nanoparticles produced by heat processing have a high degree of crystallinity. Certain impurities on the surface of the particles may be removed by heating the particles to achieve not only high crystalline purity but high purity overall.

The preferred metal/metalloid oxides include rare earth metals. Preferred rare earth metals for use in phosphor particles include, for example, europium, cerium, terbium, gadolinium, thulium, praseodymium and erbium. The metal oxides can be rare earth metal oxides. In particular, rare earth metal oxides $Z_2O_3$, where Z is a rare earth metal, have been described as suitable phosphors. These phosphors can be produced by solution chemistry approaches as described in published PCT Application WO99/46204, entitled "Self Activated Rare Earth Oxide Nanoparticles," incorporated herein by reference.

In alternative embodiments, the rare earth metal is a dopant that substitutes for a non-rare earth metal/metalloid and/or for another rare earth metal. Metalloids are elements that exhibit chemical properties intermediate between or inclusive of metals and nonmetals. Metalloid elements include silicon, boron, arsenic, antimony, and tellurium. The dopant can alter the light output and color of the material. Suitable red phosphors include, for example, $YVO_4$:Eu, ZnS:Mn, $YBO_3$:Eu, $GdBO_3$:Eu, $Y_2O_3$:Eu, and $Y_3Al_5O_{12}$:Eu. Suitable green phosphors include, for example, ZnS:Tb, $Zn_2SiO_4$:Mn, $Y_3Al_5O_{12}$:Tm, $BaAl_{12}O_{19}$:Mn and $BaMgAl_{14}O_{23}$:Mn. Suitable blue phosphors include, for example, ZnS:Ag, SrS:Ce, $BaMgAl_{14}O_{23}$:Eu, $BaMgAl_{10}O_{17}$:Eu, and $Y_3Al_5O_{12}$:Tb. In this notation, the doping element indicated on the right of the colon substitutes in the crystal lattice for one or more of the other metals in the oxide. The rare earth metal generally is in the form of an ion with a charge from +2 to +4.

When the rare earth metal is a dopant replacing either another rare earth metal or a non-rare earth metal/metalloid, the rare earth dopant generally comprises less than about 15 mole percent of the metal in the composition, in further embodiments less than about 10 mole percent, in some embodiments less than about 5 mole percent, in other embodiments from about 0.05 to about 1 mole percent of the metal/metalloid in the composition. A person of ordinary skill in the art will recognize that the present disclosure similarly covers ranges within these specific ranges.

Phosphor Applications

Many of the particles described in this application can be used as phosphors. The phosphors emit light, preferably visible light, following excitation. Some useful materials emit light in the infrared portion of the light spectrum. A variety of ways can be used to excite the phosphors, and particular phosphors may be responsive to one or more of the excitation approaches. Particular types of luminescence include cathodoluminescence, photoluminescence and electroluminescence which, respectively, involve excitation by electrons, light and electric fields Many materials that are suitable as chathodoluminescence phosphors are also suitable as electroluminescence phosphors.

In particular, the phosphor particles preferably are suitable for low-velocity electron excitation, with electrons accelerated with potentials below 1 kilovolts (KV), and more preferably below 100 V. The small size of the particles makes them suitable for low velocity electron excitation. Low energy electron excitation can be used because the correspondingly lower penetration distances of the electrons are less limiting as the particle size decreases.

Furthermore, nanoscale particles produce high luminescence with low electron velocity excitation. As the voltages decrease, optimum luminosity can be expected from small sized particles, although an optimum particle size may be reached beyond which even smaller particle sizes can result in slightly reduced luminosity. The effects of decreasing particle size on phosphors is described theoretically in "The Effects of Particle Size And Surface Recombination Rate on the Brightness of Low-Energy Phosphor," J. S. Yoo et al., J. App. Phys. 81 (6), 2810–2813 (Mar. 15, 1997), incorporated herein by reference.

Figure 10:
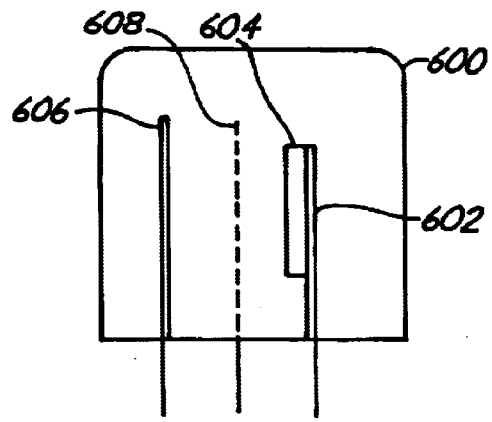
FIG. 10 is a sectional view of an embodiment of display device incorporating a phosphor layer.

The phosphor particles can be used to produce any of a variety of display devices based on low velocity electrons, high velocity electrons, or electric fields. Referring to FIG. 10, a display device 600 includes an anode 602 with a phosphor layer 604 on one side. The phosphor layer faces an appropriately shaped cathode 606, which is the source of electrons used to excite the phosphor. A grid cathode 608 can be placed between the anode 602 and the cathode 606 to control the flow of electrons from the cathode 606 to the anode 602.

Cathode ray tubes (CRTs) have been used for a long time for producing images. CRTs generally use relatively higher electron velocities. Phosphor particles, as described above, can still be used advantageously as a convenient way of supplying particles of different colors, reducing the phosphor layer thickness and decreasing the quantity of phosphor for a given luminosity. CRTs have the general structure as shown in FIG. 10, except that the anode and cathode are separated by a relatively larger distance and steering electrodes rather than a grid electrode generally are used to guide the electrons from the cathode to the anode.

Figure 11:
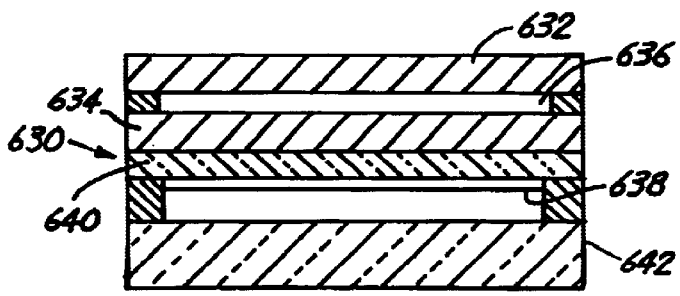
FIG. 11 is a sectional view of an embodiment of a liquid crystal display incorporating a phosphor for illumination.

Other preferred applications include the production of flat panel displays. Flat panel displays can be based on, for example, liquid crystals or field emission devices. Liquid crystal displays can be based on any of a variety of light sources. Phosphors can be useful in the production of lighting for liquid crystal displays. Referring to FIG. 11, a liquid crystal element 630 includes at least partially light transparent substrates 632, 634 surrounding a liquid crystal layer 636. Lighting is provided by a phosphor layer 638 on an anode 640. Cathode 642 provides a source of electrons to excite the phosphor layer 638. Alternative embodiments are described, for example, in U.S. Pat. No. 5,504,599, entitled "Liquid Crystal Display Device Having An EL Light Source In A Non_Display Region or a Region Besides A Display Picture Element," incorporated herein by reference.

Figure 12:
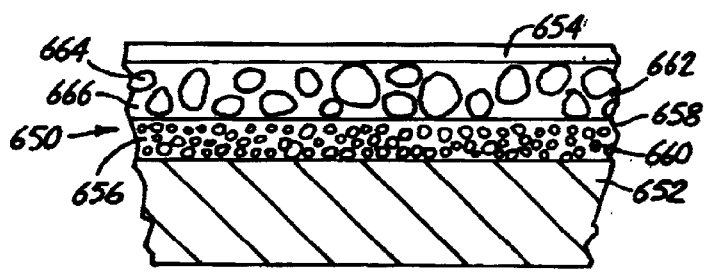
FIG. 12 is a sectional view of an electroluminescent display.

Liquid crystal displays can also be illuminated with backlighting from an electroluminescent display. Referring to FIG. 12, electroluminescent display 650 has a conductive substrate 652 that functions as a first electrode. Conductive substrate 652 can be made from, for example, aluminum, graphite or the like. A second electrode 654 is transparent and can be formed from, for example, indium tin oxide. A dielectric layer 656 may be located between electrodes 652, 654, adjacent to first electrode 652. Dielectric layer 656 includes a dielectric binder 658 such as cyanoethyl cellulose or cyanoethyl starch. Dielectric layer 656 can also include ferroelectric material 660 such as barium titanate. Dielectric layer 656 may not be needed for dc-driven (in contrast with ac-driven) electro-luminescent devices. A phosphor layer 662 is located between transparent electrode 654 and dielectric layer 662. Phosphor layer 662 includes electroluminescent particles 664 in a dielectric binder 666.

Electroluminescent display 650 also can be used for other display applications such as automotive dashboard and control switch illumination. In addition, a combined liquid crystal/electroluminescent display has been designed. See, Fuh, et al., Japan J. Applied Phys. 33:L870–L872 (1994), incorporated herein by reference.

Figure 13:
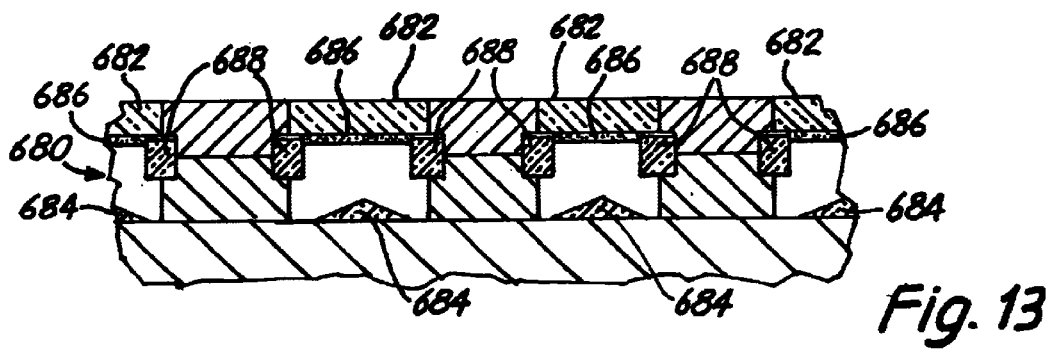
FIG. 13 is a sectional view of an embodiment of a flat panel display incorporating field emission display devices.

Referring to FIG. 13, a display 680 based on field emission devices involves anodes 682 and cathodes 684 spaced a relatively small distance apart. Each electrode pair form an individually addressable pixel. A phosphor layer 686 is located between each anode 682 and cathode 684. The phosphor layer 686 includes phosphorescent nanoparticles as described above. Phosphorescent particles with a selected emission frequency can be located at a particular addressable location. The phosphor layer 686 is excited by low velocity electrons travelling from the cathode 684 to the anode 682. Grid electrodes 688 can be used to accelerate and focus the electron beam as well as act as an on/off switch for electrons directed at the phosphor layer 686. An electrically insulating layer is located between anodes 682 and grid electrodes 688. The elements are generally produced by photolithography or a comparable techniques such as sputtering and chemical vapor deposition for the production of integrated circuits. As shown in FIG. 13, the anode should be at least partially transparent to permit transmission of light emitted by phosphor 686.

Alternatively, U.S. Pat. No. 5,651,712, entitled "Multi-Chromic Lateral Field Emission Devices With Associated Displays And Methods Of Fabrication," incorporated herein by reference, discloses a display incorporating field emission devices having a phosphor layer oriented with an edge (rather than a face) along the desired direction for light propagation. The construction displayed in this patent incorporates color filters to produce a desired color emission rather than using phosphors that emit at desired frequencies. Based on the particles described above, selected phosphor particles preferably would be used to produce the different colors of light, thereby eliminating the need for color filters.

Phosphors are also used in plasma display panels for high definition televisions and projection televisions. These applications require high luminescence. However, standard phosphors generally result in low conversion efficiency. Thus, there is significant heat to dissipate and large energy waste. Use of nanoparticles can increase the luminescence and improve the conversion efficiency. Nanoparticle based phosphors with high surface area can effectively absorb ultraviolet light and convert the energy to light output of a desired color.

Figure 14:
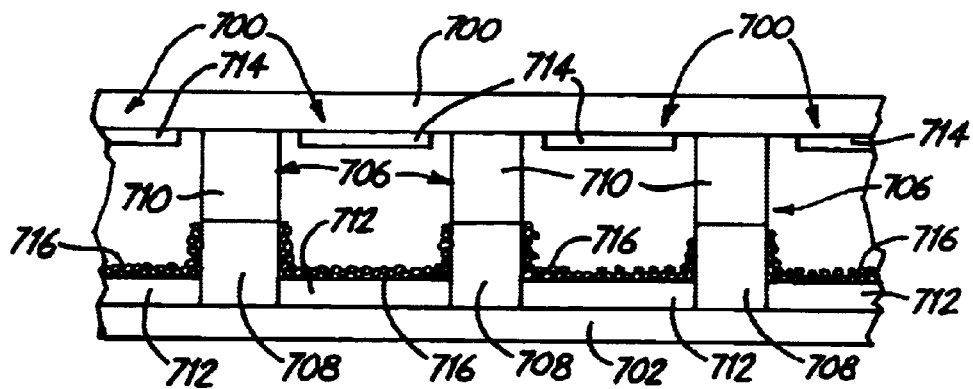
FIG. 14 is a sectional view of elements of a plasma display panel.

An embodiment of several elements 700 of a plasma display panel in a cut away sectional view is shown in FIG. 14. A plasma display panel includes a two dimensional array of plasma display elements 700 that are independently addressable. Elements 700 are located between two glass plates 702, 704 spaced apart by distance on the order of 200 microns. At least glass plate 702 is transparent. Barrier walls 706 separation glass plates 702, 704. Barrier walls 706 include an electrically conducting portion 708 and an electrically insulating section 710.

Each plasma display element 700 includes a cathode 712 and a transparent anode 714 formed from a metal mesh or indium tin oxide. A phosphor coating 716 is placed over the surface of the cathode. A noble gas, such as neon, argon, xenon or mixtures thereof, are placed between the electrodes in each element. When the voltage is sufficiently high, a plasma forms and emits ultraviolet light.

The phosphor particles can be adapted for use in a variety of other devices beyond the representative embodiments specifically described.

The nanoparticles can be directly applied to a substrate to produce the above structures. Alternatively, the nanoparticles can be mixed with a binder such as a curable polymer for application to a substrate. The composition involving the curable binder and the phosphor nanoparticles can be applied to a substrate by photolithography, screen printing or other suitable technique for patterning a substrate such as used in the formation of integrated circuit boards. Once the composition is deposited at a suitable positions on the substrate, the material can be exposed to suitable conditions to cure the polymer. The polymer can be curable by electron beam radiation, UV radiation or other suitable techniques.

Example 1

Laser Pyrolysis Synthesis of Europium Doped Barium Magnesium Aluminum Oxide

This example demonstrates the synthesis of europium doped barium magnesium aluminum oxide by laser pyrolysis. These materials are useful as blue phosphor material in plasma displays and fluorescent lamps. Laser pyrolysis was carried out using a reaction chamber essentially as described above with respect to FIGS. 4–6.

Europium nitrate ($Eu(NO_3)_3 \cdot 6H_2O$) (99.99%, 0.0025 molar) precursor, barium nitrate ($Ba(NO_3)_2$) (99.999%, 0.0475 molar), aluminum nitrate ($Al(NO_3)_2 \cdot 9H_2O$) (99.999%, 0.5 molar), and magnesium nitrate ($Mg(NO_3)_2 \cdot XH_2O$) (99.999%, 0.05 molar) precursors were dissolved in deionized water. All the metal precursors were obtained from Alfa Aesar, Inc., Ward Hill, Mass. The solutions were stirred for 2–3 hours on a hot plate using a magnetic stirrer. The aqueous metal precursor solutions were carried into the reaction chamber as an aerosol. $C_2H_4$ gas was used as a laser absorbing gas, and nitrogen was used as an inert diluent gas. The reactant mixture containing the metal precursors, $N_2$, $O_2$ and $C_2H_4$ was introduced into the reactant nozzle for injection into the reaction chamber. Additional parameters of the laser pyrolysis synthesis relating to the particles of Example 1 are specified in Table 1.

TABLE 1

| | 1 | 2 |
|---|---|---|
| Pressure (Torr) | 300 | 180 |
| Nitrogen F.R.-Window (SLM) | 5.0 | 15.0 |
| Nitrogen F.R.-Shielding (SLM) | 20.0 | 32.0 |
| Ethylene (SLM) | 5.0 | 1.5 |
| Diluent Gas (nitrogen) (SLM) | 14.0 | 6.0 |
| Oxygen (SLM) | 2.7 | 4.5 |
| Laser Input (Watts) | 1400 | 1700 |
| Laser Output (Watts) | 1286 | 1653 |
| Production Rate (g/hr) | 0.6 | 0.7 |
| Precursor Delivery Rate to Atomizer* (ml/min) | 20 | 10 | slm = standard liters per minute
Argon - Win. = argon flow through inlets 216, 218
Argon - Sld. = argon flow through annular channel 142.
*A majority of the aerosol precursor returns down the nozzle and is recycled.

Figure 15:
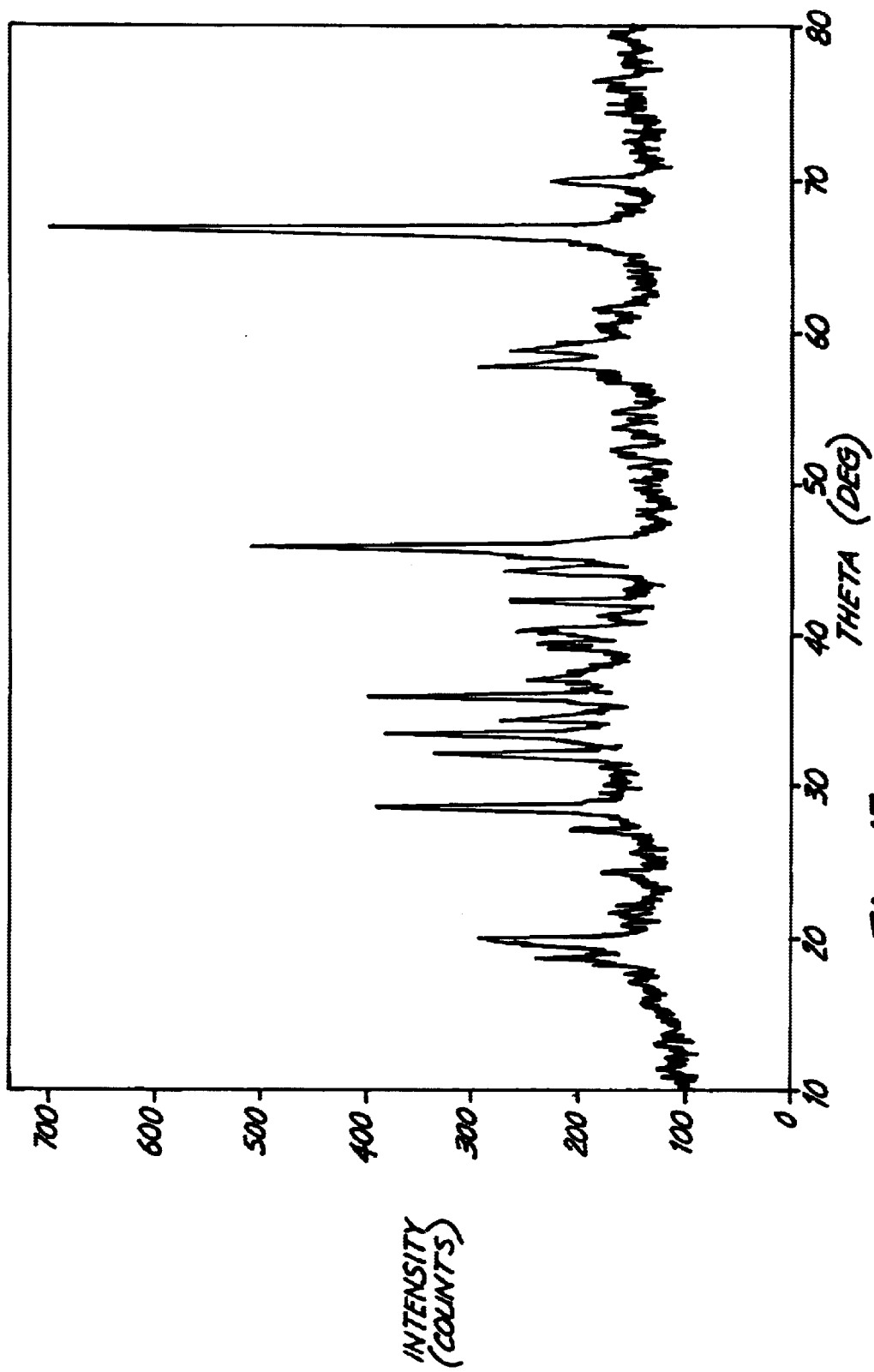
FIG. 15 is an x-ray diffractogram of a sample of europium doped barium magnesium aluminum oxide produced by laser pyrolysis.
Figure 16:
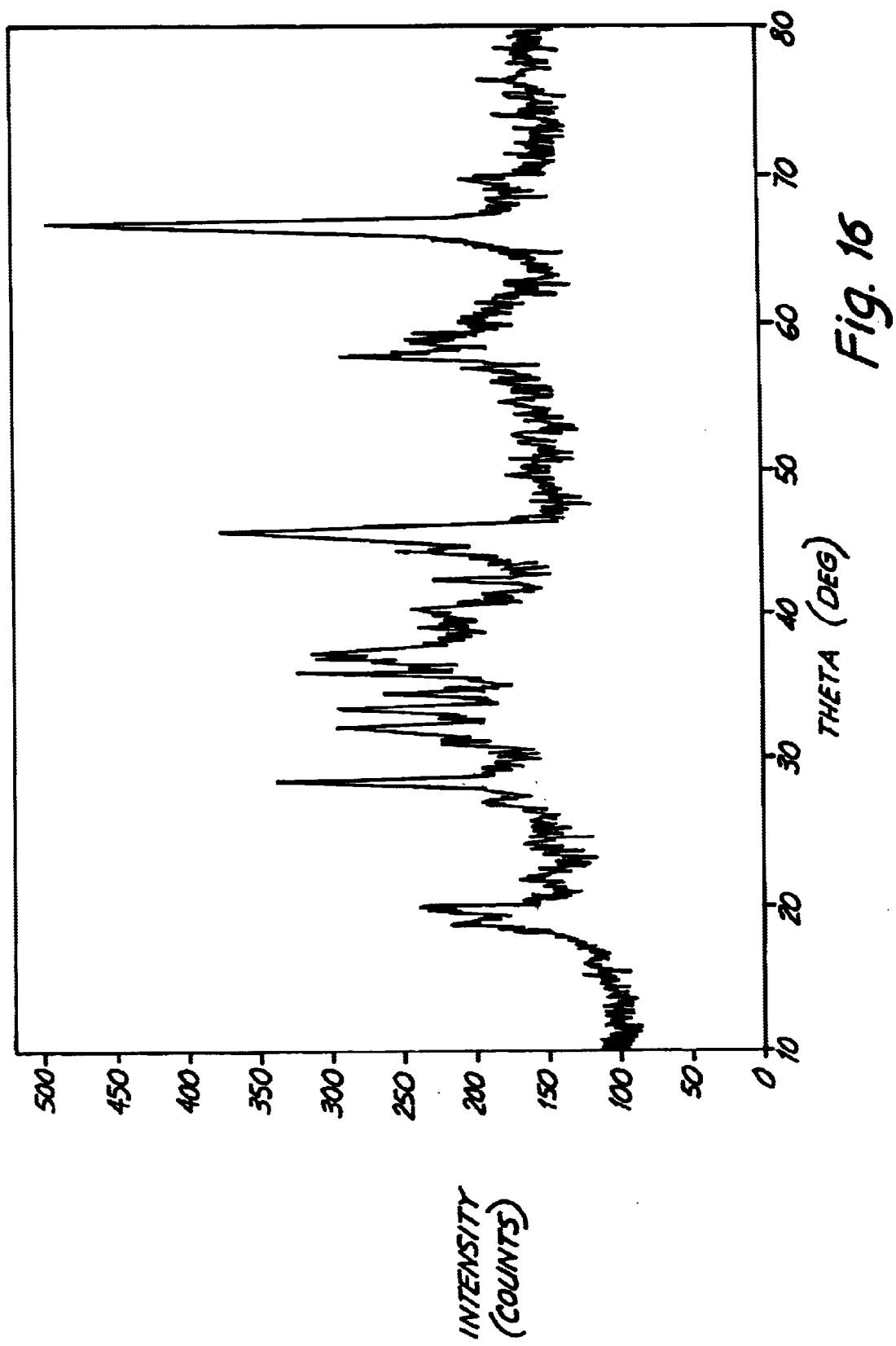
FIG. 16 is an x-ray diffractogram of a sample of europium doped barium magnesium aluminum oxide produced by laser pyrolysis produced under different conditions that used to produce the sample of FIG. 15.

To evaluate the atomic arrangement, the samples were examined by x-ray diffraction using the Cu(Kα) radiation line on a Rigaku Miniflex x-ray diffractometer. X-ray diffractograms for a sample produced under the conditions specified in column 1 and 2 of Table 1 is shown in FIGS. 15 and 16, respectively. In each of the samples, crystalline phases were identified that corresponded to europium doped barium magnesium aluminum oxide (BaMgAl$_{10}$O$_{17}$:Eu) by comparison with the diffractogram of commercially available powders. Based on the x-ray spectra, the materials produced under the conditions in the first column of Table 1 seemed more crystalline than the particles produced under the conditions in the second column of Table 2. Additional peaks corresponding to additional phases are observed that have not been identified. There may be some amorphous phases.

Samples of europium doped barium magnesium aluminum oxide nanoparticles produced by laser pyrolysis according to the conditions specified in Table 1 were heated in an oven under reducing conditions. The oven was essentially as described above with respect to FIG. 9. Between about 100 and about 700 mg of nanoparticles were placed in an open 1 cc alumina boat within an alumina tube projecting through the oven. A mixture of 96.04% argon and 3.96% hydrogen was flowed through a 3.0 inch diameter quartz tube at a flow rate of 100 sccm. The oven was heated to about 1300° C. The particles produced under the conditions in column 1 of Table 1 were heated for about 2 hours, and the particles produced under the conditions in column 2 of Table 1 were heated for about 2 hours and 30 minutes. These particles are respectively referred to as Hi (starting powders were produced under conditions in column 1 of Table 1) and H2 (starting powders were produced under conditions in column 2 of Table 1).

Figure 17:
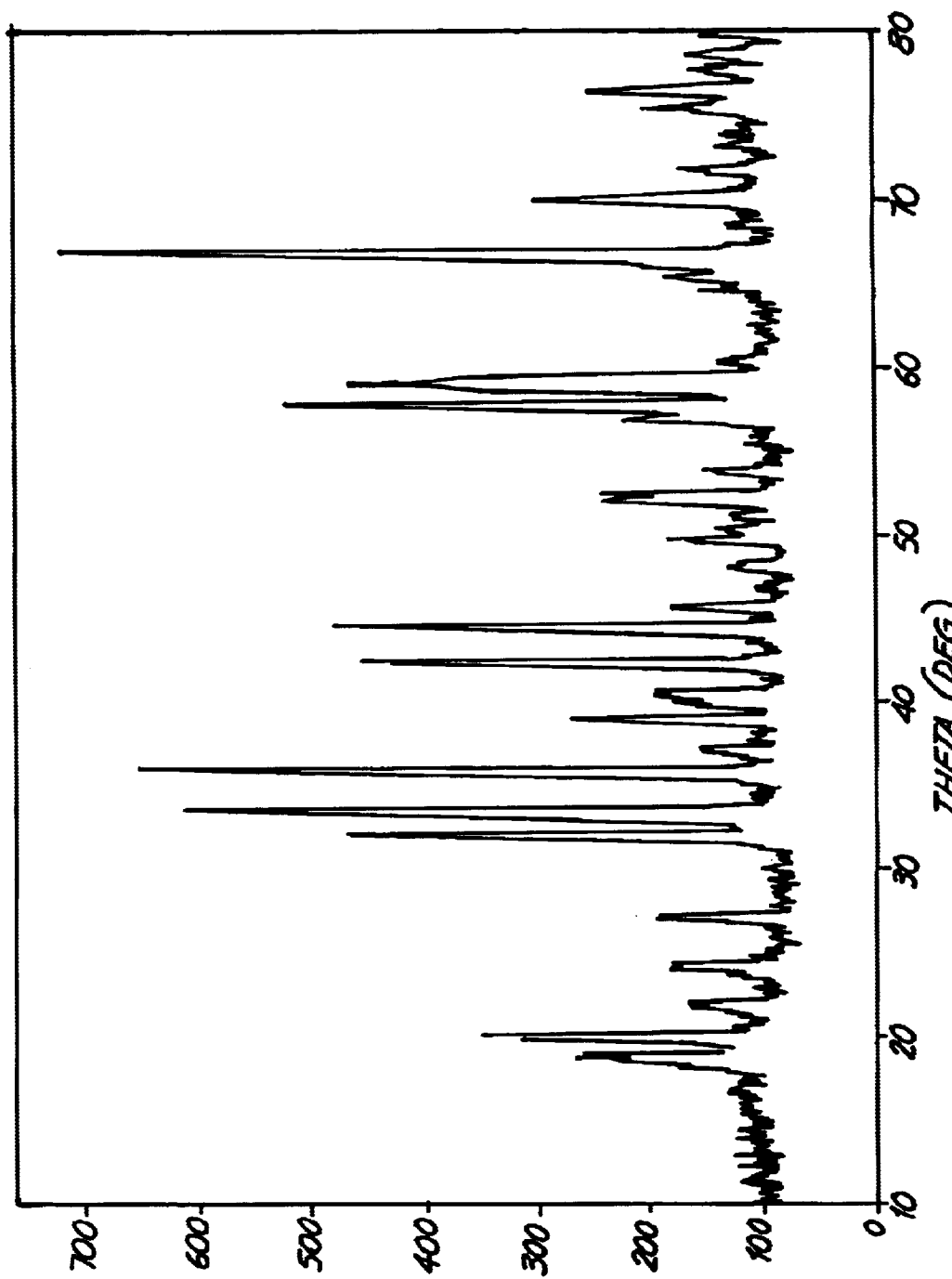
FIG. 17 is an x-ray diffractogram of a first sample produced by laser pyrolysis following a heat treatment.
Figure 18:
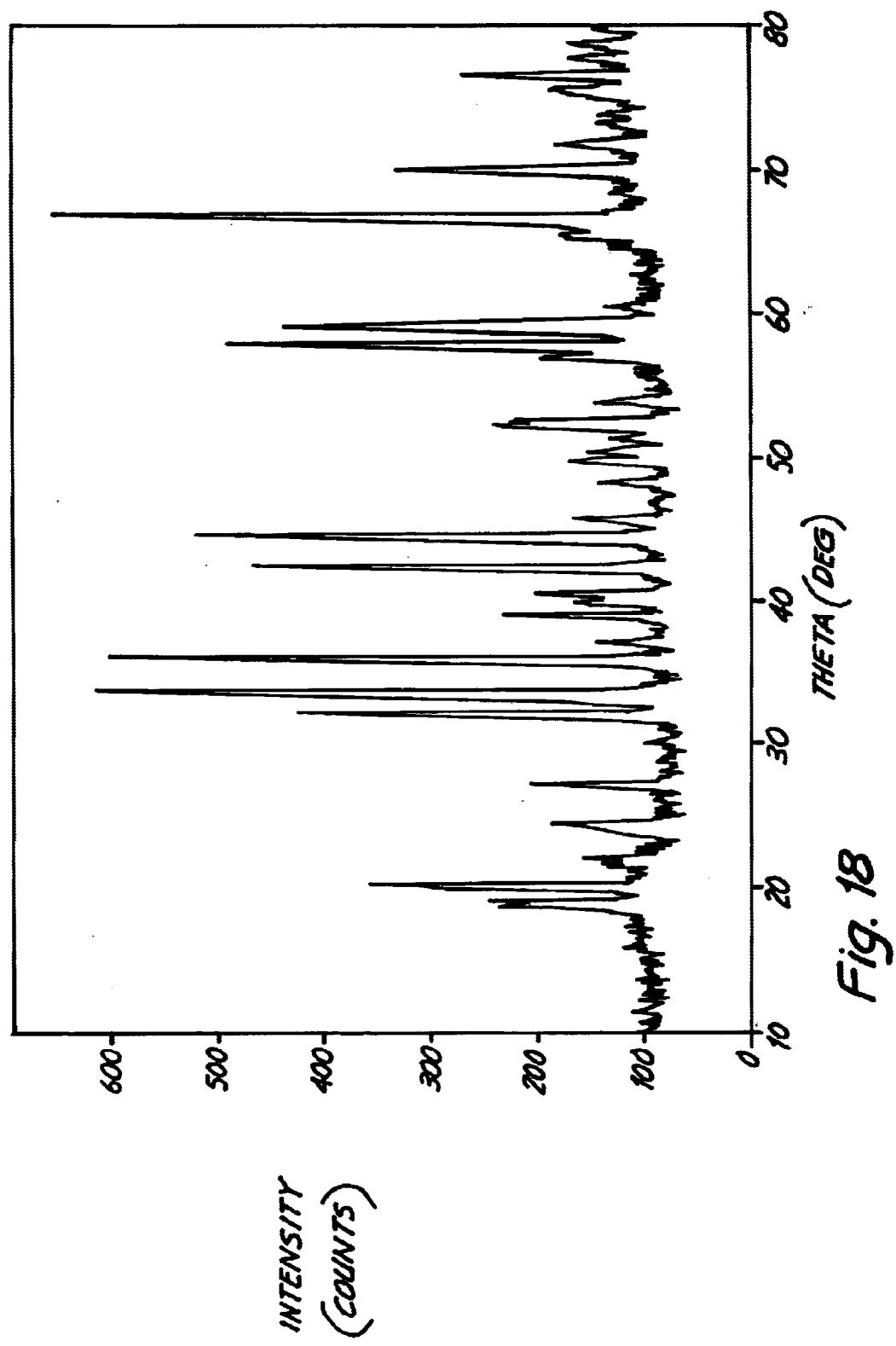
FIG. 18 is an x-ray diffractogram of a second sample produced by laser pyrolysis following a heat treatment.

The crystal structure of the resulting heat-treated particles was determined by x-ray diffraction. The x-ray diffractogram for heated sample H1 is shown in FIG. 17, and the x-ray diffractogram for heated sample H2 is shown in FIG. 18. Both x-ray diffractograms in FIGS. 17 and 18 are similar to each other and correspond to highly crystalline, phase pure samples of europium doped barium magnesium aluminum oxide.

Figure 19:
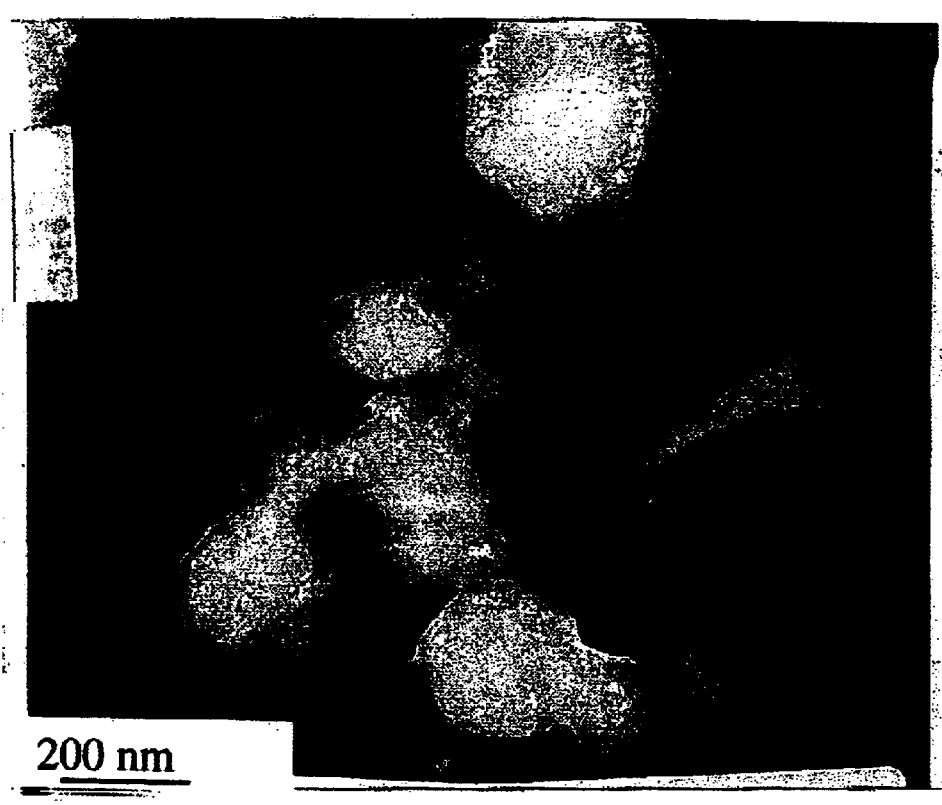
FIG. 19 is a transmission electron micrograph of a powder used to generate the x-ray diffractogram in FIG. 17.

Transmission electron microscopy (TEM) was used to evaluate particle sizes and morphology of the heat treated samples. A TEM micrograph of the particles of sample H2 is shown in FIG. 19. The uniformity of the material can be improved by reducing the reactant density in the laser reaction zone. Also, using chloride salt precursors rather than the nitrate precursors likely would result in more uniform materials based on experiences.

Also, BET surface areas were measured for the two particle samples produced by laser pyrolysis under the conditions specified in columns 1 and 2 of Table 1 and for portions of the samples following heat treatment. The BET surface area was determined with an N$_2$ gas absorbate. The BET surface area was measured with a Micromeritics Tristar 3000™ instrument. The samples produced by laser pyrolysis as specified in columns 1 and 2 of Table 1 had BET surface areas of 11.6 m$^2$/g and 17.8 m$^2$/g, respectively. For the heat treated samples, particles from sample H1 had a BET surface area of 4.41 m$^2$/g, and particles from sample H2 had a BET surface area of 8.44 m$^2$/g.

Example 2

Europium Doped Yttrium Oxide

A europium doped mixed metal oxide nanoparticles have also been produced, in which the mixed metal oxide included a stoichiometric amount of rare earth metal. These materials are useful as red phosphor material in field emission devices. Laser pyrolysis was carried out using a reaction chamber essentially as described above with respect to FIGS. 4–6.

Europium nitrate (Eu(NO$_3$)$_3$.6H$_2$O) (99.99%, [?] molar) precursor and yttrium nitrate (Y(NO$_3$)$_2$) (99.999%, [?] molar) precursors were dissolved in deionized water. All the metal precursors were obtained from Alfa Aesar, Inc., Ward Hill, Mass. The solutions were stirred for 2–3 hours on a hot plate using a magnetic stirrer. The aqueous metal precursor solutions were carried into the reaction chamber as an aerosol. C$_2$H$_4$ gas was used as a laser absorbing gas, and argon was used as an inert diluent gas. The reactant mixture containing the metal precursors, N$_2$, O$_2$ and C$_2$H$_4$ was introduced into the reactant nozzle for injection into the reaction chamber. Additional parameters of the laser pyrolysis synthesis relating to the particles of Example 2 are specified in Table 2.

TABLE 2

| | 1 |
|---|---|
| Pressure (Torr) | 250 |
| Argon F.R.-Window (SLM) | 10.0 |
| Argon F.R.-Shielding (SLM) | 8.0 |
| Ethylene (SLM) | 2.5 |
| Diluent Gas (argon) (SLM) | 12.0 |
| Oxygen (SLM) | 3.55 |
| Laser Input (Watts) | 1400 |
| Laser Output (Watts) | 1110 |
| Production Rate (g/hr) | 1.1 |
| Precursor Delivery Rate to Atomizer* (ml/min) | 11.8 | slm = standard liters per minute
Argon - Win. = argon flow through inlets 216, 218
Argon - Sld. = argon flow through annular channel 142.
*A majority of the aerosol precursor returns down the nozzle and is recycled.

Figure 20:
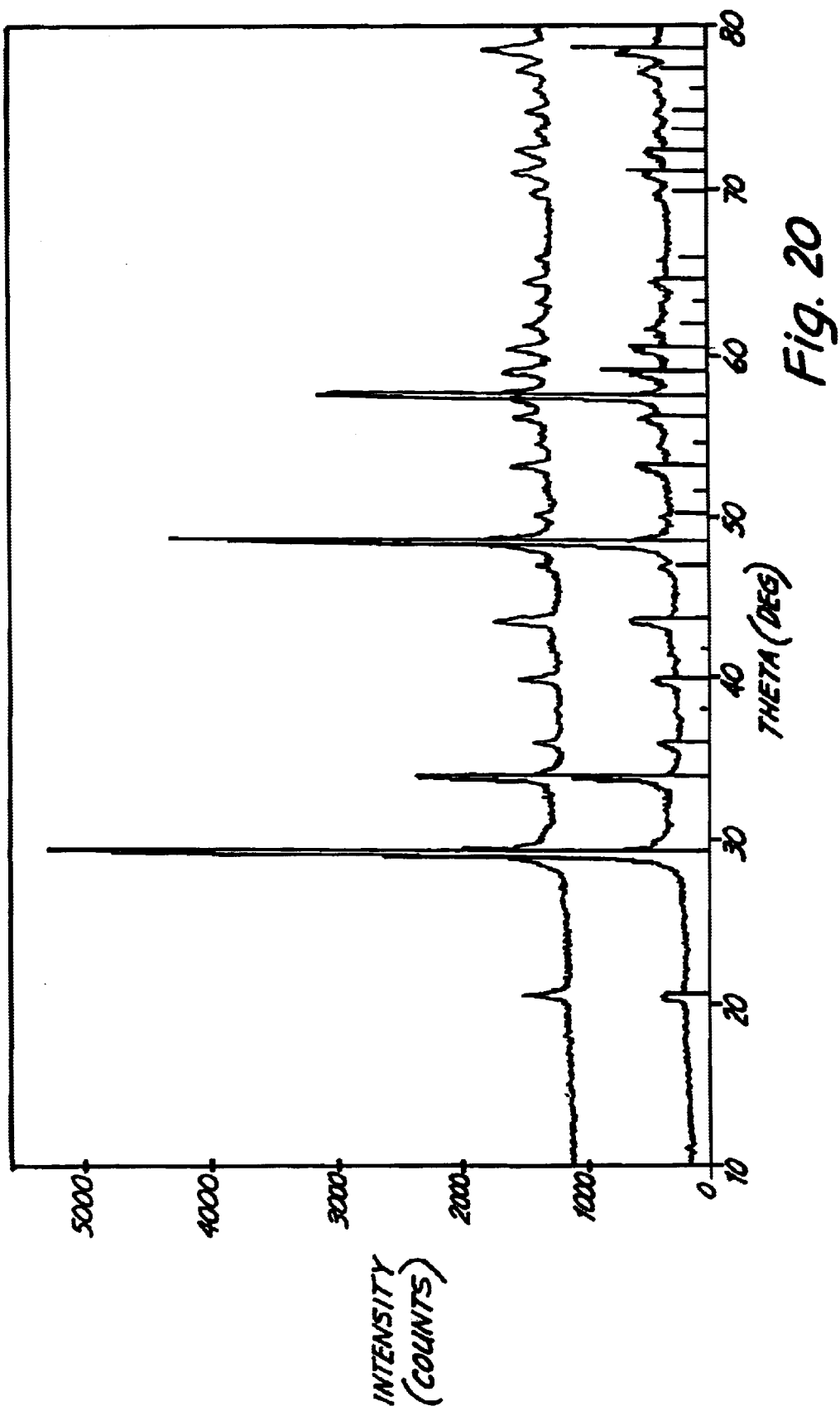
FIG. 20 is an x-ray diffractogram of two samples of $(Y_{0.95}Eu_{0.05})_2O_3$ produced by laser pyrolysis.

To evaluate the atomic arrangement, the samples were examined by x-ray diffraction using the Cu(Kα) radiation line on a Rigaku Miniflex x-ray diffractometer. X-ray diffractograms for two samples produced under the conditions specified in Table 2 are shown in FIG. 20. In each of the samples, crystalline phases were identified that corresponded to europeum doped yttrium oxide (Y$_{0.95}$Eu$_{0.05}$O$_3$) by comparison with published diffractogram data, which is indicated by the histogram lines at the bottom of FIG. 20. The similarity of the diffractograms for the two samples demonstrates the reproducability of the laser pyrolysis synthesis.

Although the present invention has been described with reference to preferred embodiments, workers skilled in the art will recognize that changes may be made in form and detail without departing from the spirit and scope of the invention.

What is claimed is:

1. A collection of particles comprising a metal/metalloid oxide having an average particle size from about 2 nm to about 1 micron, the metal/metalloid oxide comprising a non-rare earth metal/metalloid oxide wherein less than about 15 mole percent of a stoichiometric amount of a non rare earth metal/metalloid is substituted with rare earth metal, and wherein 95 percent of the primary particles have ratios of the dimension along the major axis to the dimension among the minor axis less than about 2 and wherein the collection of particles has a distribution of particle sizes with at least about 95 percent of the primary particles having a diameter greater than about 40 percent of the average diameter and less than about 225 percent of the average diameter.

2. The collection of particles of claim 1 having an average particle size from about 15 nm to about 100 nm.

3. The collection of particles of claim 1 having an average particle size from about 15 nm to about 50 nm.

4. The collection of particles of claim 1 having essentially no particle with an diameter greater than about 5 times the average particle size.

5. The collection of particles of claim 1 having essentially no particle with an diameter greater than about 3 times the average particle size.

6. The collection of particles of claim 1 wherein less than about 10 mole percent of the metal/metalloid is rare earth metal.

7. The collection of particles of claim 1 wherein less than about 5 mole percent of the metal/metalloid is rare earth metal.

8. The collection of particles of claim 1 wherein the non-rare earth metal/metalloid comprises zinc or aluminum.

9. The collection of particles of claim 1 wherein the non-rare earth metal/metalloid oxide comprises zinc.

10. The collection of particles of claim 1 wherein the collection of particles have an average particle size from about 2 nm to about 50 nm.

11. The collection of particles of claim 1 having a distribution of particle sizes with at least about 95 percent of the primary particles having a diameter greater than about 45 percent of the average diameter and less than about 200 percent of the average diameter.

12. The collection of particles of claim 1 wherein the rare earth metal comprises europium.

13. A display device comprising a collection of metal oxide particles of claim 1.

14. A collection of particles comprising barium magnesium aluminum oxide having an average particle size of less than about 500 nm, and wherein 95 percent of the primary particles have ratios of the dimension along the major axis to the dimension along the minor axis less than about 2 and wherein the collection of particles has a distribution of particle sizes with at least about 95 percent of the primary particles having a diameter greater than about 40 percent of the average diameter and less than about 225 percent of the average diameter.

15. The collection of particles of claim 14 having an average particle size from about 2 nm to about 100 nm.

16. The collection of particles of claim 14 having a rare earth dopant comprising less than about 1 mole percent of the metal in the particles.

17. The collection of particles of claim 14 wherein the barium magnesium aluminum oxide has a stoichiometry of $BaMgAl_{10}O_{17}$.

18. The collection of particles of claim 14 having an average particle size from about 2 nm to about 50 nm.

19. The collection of particles of claim 14 having essentially no particle with an diameter greater than about 5 times the average particle size.

20. The collection of particles of claim 14 having a rare earth dopant wherein less than about 5 mole percent of the metal/metalloid is rare earth metal.

21. The collection of particles of claim 20 wherein the rare earth metal comprises europium.

22. The collection of particle of claim 14 having a distribution of particle sizes with at least about 95 percent of the primary particles having a diameter greater than about 45 percent of the average diameter and less than about 200 percent of the average diameter.

* * * * *